United States Patent
Shimizu et al.

(10) Patent No.: US 8,454,899 B2
(45) Date of Patent: Jun. 4, 2013

(54) GAS REFORMING DEVICE

(75) Inventors: Naohiro Shimizu, Nagoya (JP); Yuuichirou Imanishi, Nagoya (JP); Sozaburo Hotta, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/021,968

(22) Filed: Feb. 7, 2011

(65) Prior Publication Data

US 2011/0135542 A1   Jun. 9, 2011

Related U.S. Application Data

(63) Continuation of application No. PCT/JP2009/063984, filed on Aug. 7, 2009.

(30) Foreign Application Priority Data

Aug. 11, 2008   (JP) ................................. 2008-207397

(51) Int. Cl.
B01J 19/08   (2006.01)

(52) U.S. Cl.
USPC ................. 422/186; 422/186.04; 422/186.21; 422/186.3; 204/164

(58) Field of Classification Search
USPC ...... 422/186, 186.04, 186.21, 186.3; 204/164
See application file for complete search history.

(56) References Cited

U.S. PATENT DOCUMENTS

| | | | |
|---|---|---|---|
| 2005/0174062 A1* | 8/2005 | Tanaka et al. | 315/111.21 |
| 2006/0038992 A1* | 2/2006 | Morrisroe | 356/316 |
| 2006/0115390 A1 | 6/2006 | Tamura et al. | |
| 2006/0115391 A1* | 6/2006 | Kim et al. | 422/186.18 |
| 2008/0122368 A1 | 5/2008 | Saito et al. | |

FOREIGN PATENT DOCUMENTS

| | | |
|---|---|---|
| JP | 06-010652 A1 | 1/1994 |
| JP | 2001-118699 A1 | 4/2001 |
| JP | 2002-151295 A1 | 5/2002 |
| JP | 2003-001104 A1 | 1/2003 |
| JP | 2003-053129 A1 | 2/2003 |
| JP | 2005-251444 A1 | 9/2005 |
| JP | 2006-122658 A1 | 5/2006 |
| JP | 2008-095131 A1 | 4/2008 |
| WO | 2008/026712 A1 | 3/2008 |

* cited by examiner

*Primary Examiner* — Xiuyu Tai
(74) *Attorney, Agent, or Firm* — Burr & Brown

(57) ABSTRACT

A gas reforming device including: a flow passage forming body flow passage through which process gas flows; a cathode provided on a cross section of the flow passage; an anode provided apart from the cathode, and including a bar-like portion; and a pulse power supply that applies a pulse voltage between the cathode and the anode. The cathode includes: an opening array body that has at least a surface thereof made of an insulator, and has a planar structure in which openings through which the process gas passes are arrayed; and a grounding electrode provided on a peripheral portion of the flow passage. A tip end of the bar-like portion of the anode is located in an inside of the flow passage of the process gas, and is spaced apart from the opening array body in a direction parallel to a direction where the process gas flows.

6 Claims, 21 Drawing Sheets

F I G . 2
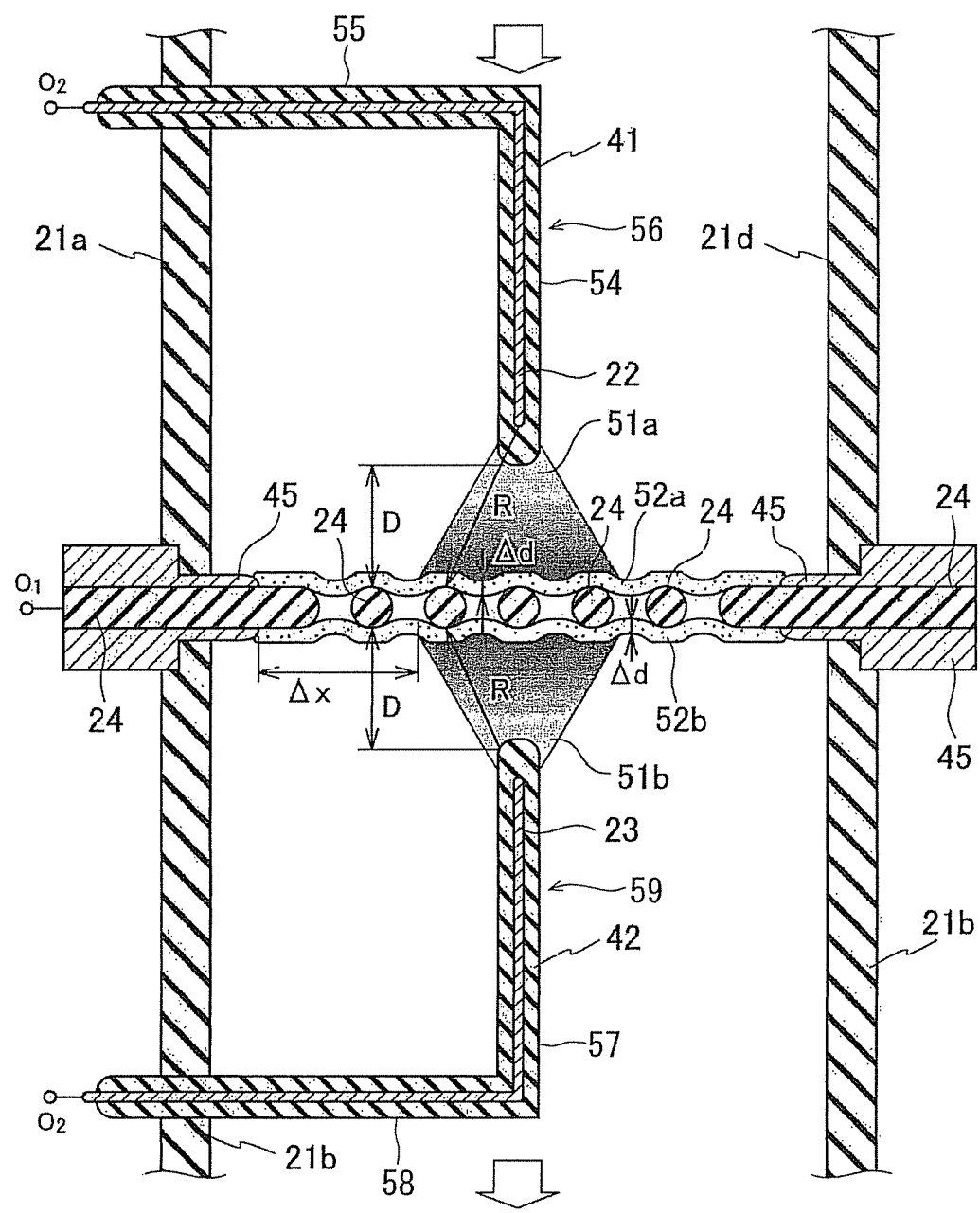

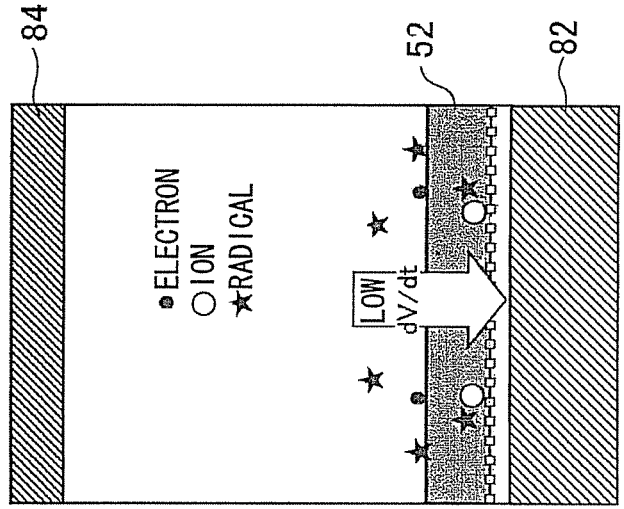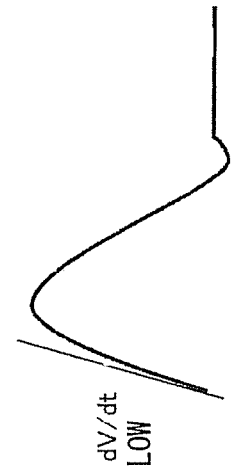
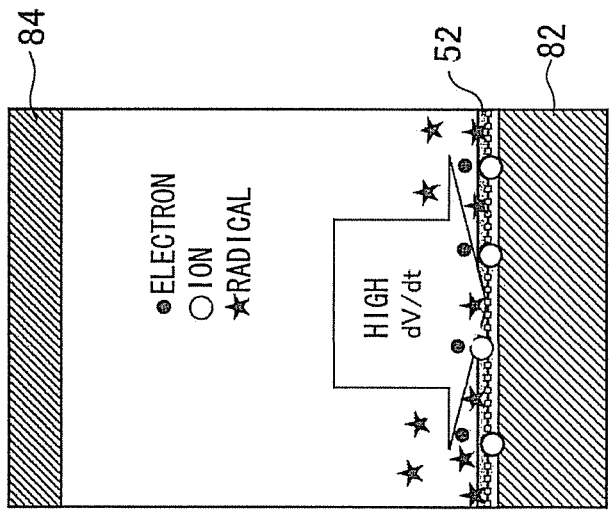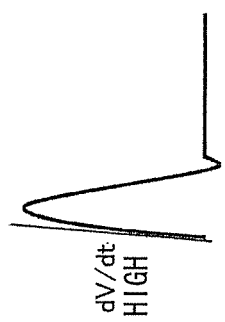
FIG. 3A  FIG. 3B

F I G. 6 A
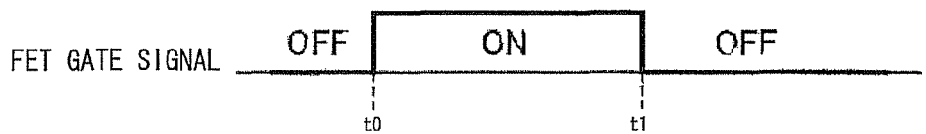
F I G. 6 B
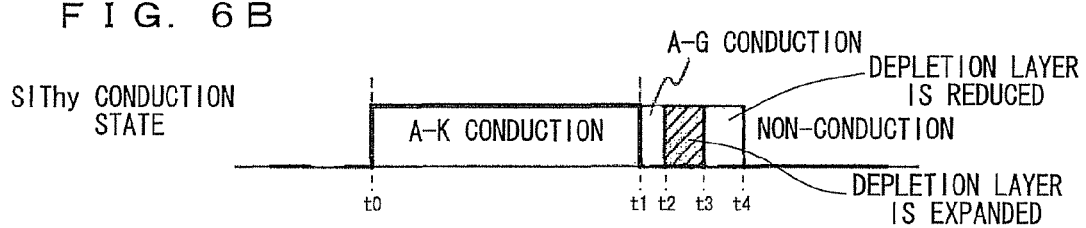
F I G. 6 C
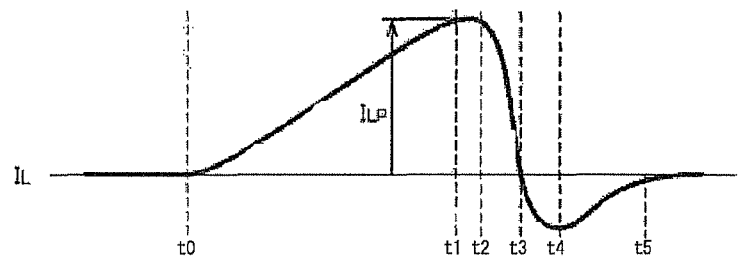
F I G. 6 D
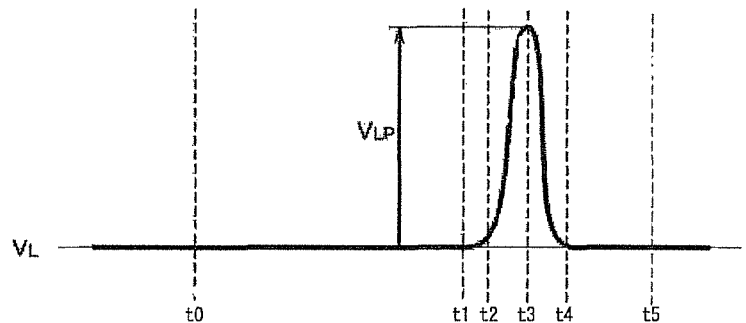
F I G. 6 E
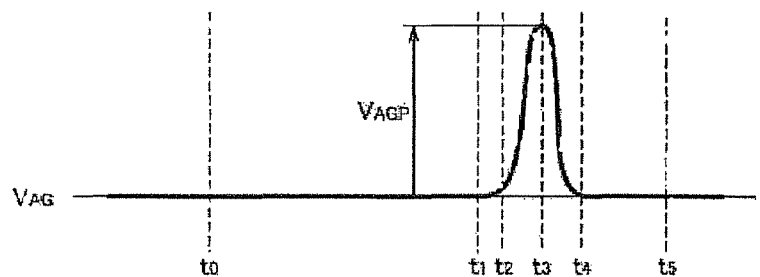

F I G . 2 3
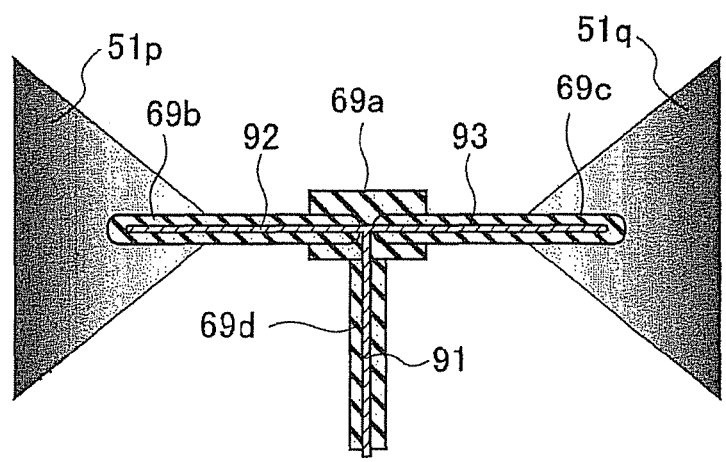
F I G . 2 4
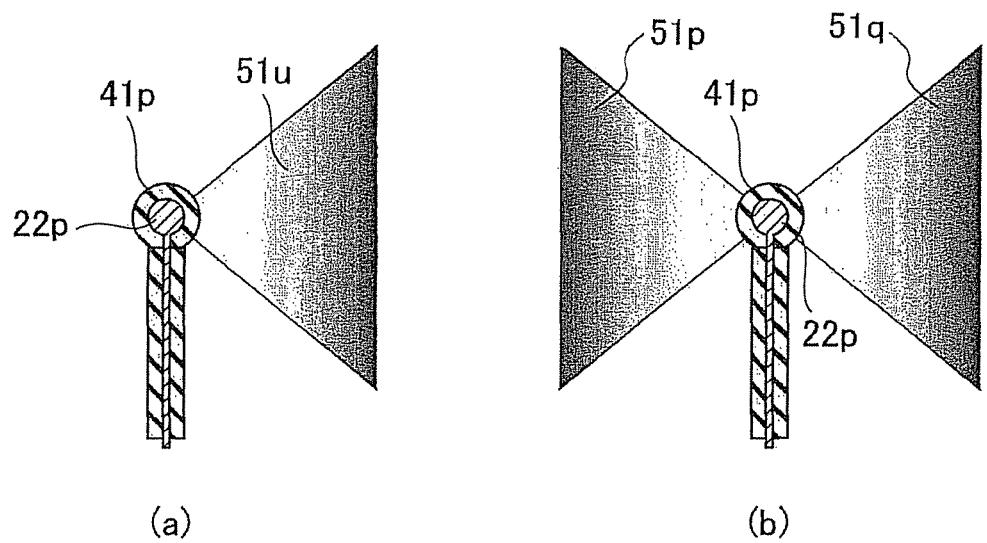
(a)　　　　　　　　　　　　　(b)

FIG. 27
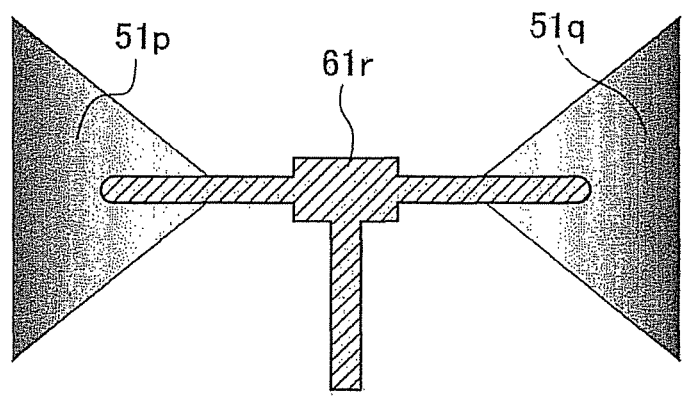
FIG. 28
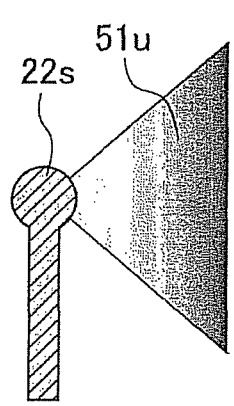
(a)
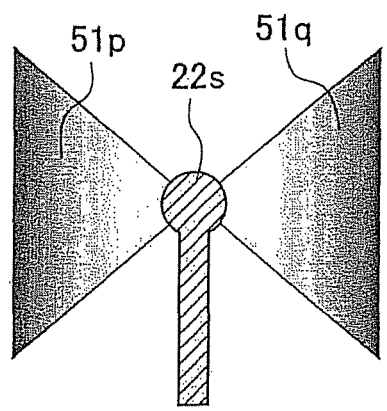
(b)

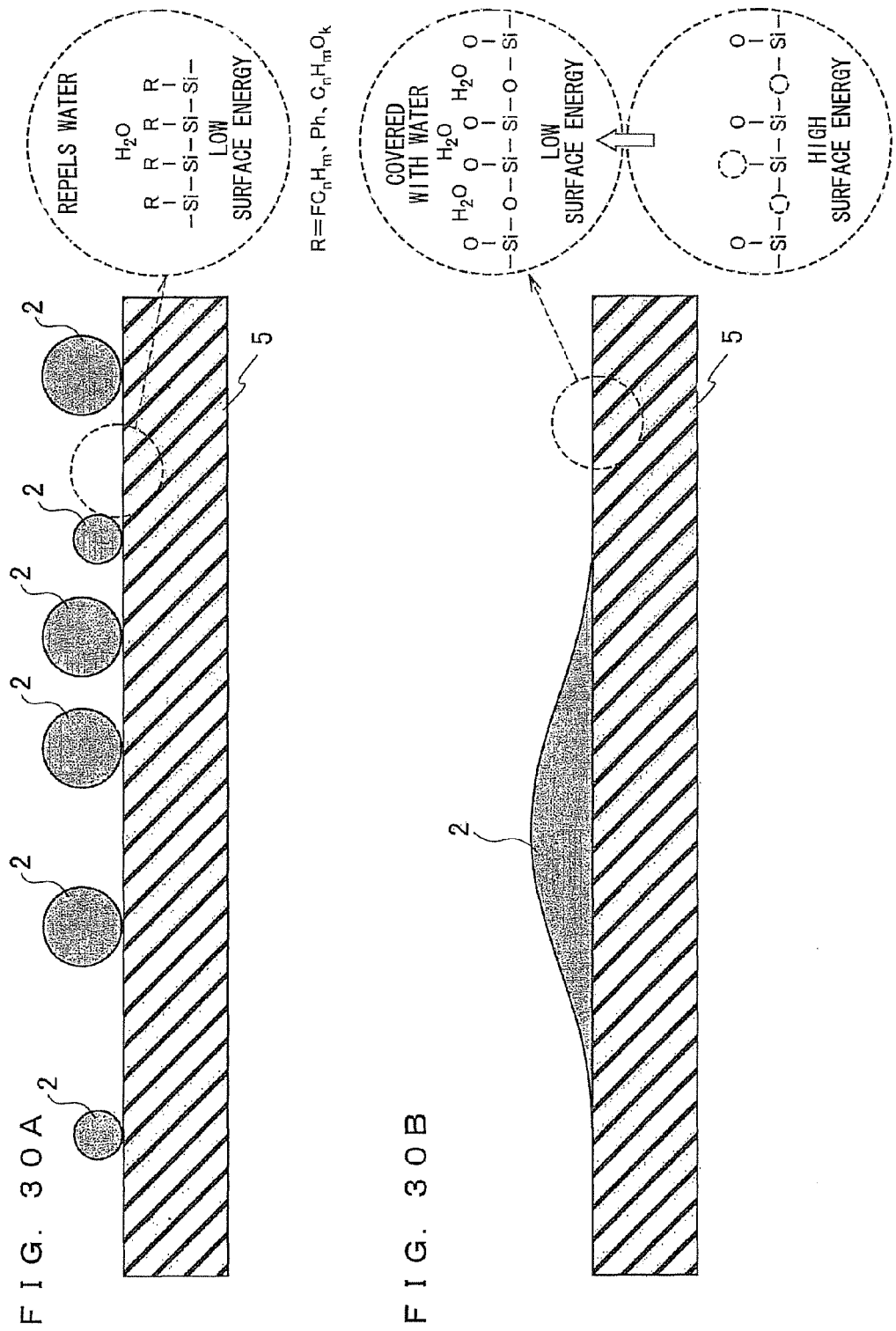

GAS REFORMING DEVICE

FIELD OF THE INVENTION

The present invention relates to a gas reforming device, and particularly to a gas reforming device that activates process gas by non-thermal equilibrium low-temperature plasma.

BACKGROUND ART OF THE INVENTION

Heretofore, a parallel flat plate structure in which a flat plate-like anode and a flat plate-like cathode are opposed in parallel to each other has been known as a structure of a reactor which a gas reforming device (hereinafter, also referred to as a "plasma reformer") includes, the gas reforming device activating process gas by non-thermal equilibrium low-temperature plasma and generating reform gas (Patent Document 1). In general, the anode and the cathode are embedded in flat plates as dielectrics. An electric discharge is generated between the anode and the cathode, which are embedded in the flat plates as the dielectrics.

PRIOR ART DOCUMENT

Patent Document

Patent Document 1: Japanese Patent Application Laid-Open No. 2005-251444

DISCLOSURE SUMMARY OF THE INVENTION

In the plasma reformer including the reactor with the parallel flat plate structure, a charge capacity between the anode and the cathode is large, and it is necessary to apply a pulse voltage with a long pulse width between the anode and the cathode. In particular, in the case where the dielectrics are provided on opposite surfaces of the anode and the cathode, a tendency of the above becomes significant. However, if the pulse voltage with the long pulse width is applied to between the anode and the cathode, then heat is generated and inflicts heat damage on an object. Moreover, in the plasma reformer including the reactor with the parallel flat plate structure, in order to uniformly generate the electric discharge, necessary energy becomes large, and a heat loss also becomes large. Furthermore, in the plasma reformer including the reactor with the parallel flat plate structure, an activation effect for the process gas differs between an inlet side and outlet side of the process gas, and accordingly, efficient reforming thereof is difficult.

In consideration of the foregoing problems, it is an object of the present invention to provide a gas reforming device capable of low-damage processing for the object, and capable of efficient reformation.

In accordance with a first aspect of the present invention, a gas reforming device includes: a flow passage forming body in which a flow passage through which process gas flows is formed; a cathode provided on a cross section of said flow passage; a first anode that is provided apart from said cathode, and includes a bar-like portion; and a pulse power supply that applies a pulse voltage to between said cathode and said anode, wherein said cathode includes: an opening array body that has at least a surface thereof made of an insulator, and has a planar structure in which openings through which the process gas passes are arrayed; and a grounding electrode provided on a peripheral portion of said flow passage, a tip end of said bar-like portion of said first anode is located in an inside of the flow passage of the process gas, and is spaced apart from said opening array body in a direction parallel to a direction where the process gas flows, and said grounding electrode is provided at a position of contacting an end portion of an ion sheath layer spread on the surface of said opening array body by the application of the pulse voltage to between said cathode and said anode.

In accordance with a second aspect of the present invention, the gas reforming device according to the first aspect further includes: a second anode that is provided apart from said anode, and includes a bar-like portion, wherein said pulse power supply also applies a pulse voltage to between said second anode and said cathode, a tip end of the bar-like portion of said second anode is located in the inside of the flow passage of the process gas, and is spaced apart from said opening array body in the direction parallel to the direction where the process gas flows, and said cathode is sandwiched between the tip end of the bar-like portion of said first anode and the tip end of the bar-like portion of said second anode.

In accordance with a third aspect of the present invention, a gas reforming device includes: first and second anodes arranged opposite to each other; and a common cathode that is sandwiched between respective tip ends of said first and second anodes, has a grid shape, has at least a surface thereof made of an insulator, and includes a grounding electrode on a peripheral portion thereof, wherein said grounding electrode is brought into contact with an end portion of an ion sheath layer spread on the surface of said common cathode, whereby a grounding potential is given to said ion sheath layer, and pulse voltages in which polarities are equal to each other are applied to said first and second anodes, and process gas introduced in a direction parallel to a direction of shortest inter-electrode distances between said first anode and said common cathode and between said second anode and said common cathode is activated by non-thermal equilibrium low-temperature plasmas individually formed between said first anode and said common cathode and between said second anode and said common cathode, and reform gas is generated.

In accordance with a fourth aspect of the present invention, in the gas reforming device of the third aspect, pulse voltages in which a maximum rise rate dV/dt is 100 to 1000 kV/µs are individually applied to between said first anode and said common cathode and to between said second anode and said common cathode.

In accordance with a fifth aspect of the present invention, in the gas reforming device of the third or fourth aspect, pressures between said first anode and said common cathode and between said second anode and said common cathode are an atmospheric pressure.

In accordance with a sixth aspect of the present invention, in the gas reforming device of the third or fourth aspect, pressures between said first anode and said common cathode and between said second anode and said common cathode are in a reduced-pressure state with a pressure of 10 kPa or more.

In accordance with a seventh aspect of the present invention, a gas reforming device includes: first and second cathodes which are arranged opposite to each other, individually have a grid shape, have at least surfaces thereof made of an insulator, and individually include grounding electrodes on peripheral portions thereof; and a common anode sandwiched between the respective surfaces of said first and second cathodes so as to be spaced apart therefrom, wherein said grounding electrodes are individually brought into contact with end portions of ion sheath layers spread on the respective surfaces of said first and second cathodes, whereby a ground potential is given to said ion sheath layers, and pulse voltages are applied to between said first cathode and said common anode and to between said second cathode and said common anode, and process gas introduced in a direction parallel to a direction of shortest inter-electrode distances between said first cathode and said common anode and between said second cathode and said common anode is activated by non-thermal equilibrium low-temperature plasmas individually formed between said first cathode and said common anode and between said second cathode and said common anode, and reform gas is generated.

In accordance with an eighth aspect of the present invention, in the gas reforming device of the seventh aspect, pulse voltages in which a maximum rise rate dV/dt is 100 to 1000 kV/µs are individually applied to between said first cathode and said common anode and to between said second cathode and said common anode.

In accordance with a ninth aspect of the present invention, in the gas reforming device of the seventh or eighth aspect, pressures between said first cathode and said common anode and between said second cathode and said common anode are an atmospheric pressure.

In accordance with a tenth aspect of the present invention, in the gas reforming device of the seventh or eighth aspect, pressures between said first cathode and said common anode and between said second cathode and said common anode are in a reduced-pressure state with a pressure of 10 kPa or more.

In accordance with an eleventh aspect of the present invention, a gas reforming device includes: an anode; and a cathode that is arranged opposite to a tip end of said anode, has a grid shape, has at least a surface thereof made of an insulator, and includes a grounding electrode on a peripheral portion thereof, wherein said grounding electrode is brought into contact with an end portion of an ion sheath layer spread on the surface of said cathode, whereby a ground potential is given to said ion sheath layer, and a pulse voltage is applied to between said anode and said cathode, and process gas introduced in a direction parallel to a direction of a shortest inter-electrode distance between said anode and said cathode is activated by non-thermal equilibrium low-temperature plasma formed between said anode and said cathode.

In accordance with a twelfth aspect of the present invention, in the gas reforming device of the eleventh aspect, a pulse voltage in which a maximum rise rate dV/dt is 100 to 1000 kV/µs is applied to between said anode and said cathode.

In accordance with a thirteenth aspect of the present invention, in the gas reforming device of the eleventh or twelfth aspect, a pressure between said anode and said cathode is an atmospheric pressure.

In accordance with a fourteenth aspect of the present invention, in the gas reforming device of the eleventh or twelfth aspect, a pressure between the said anode and said cathode is in a reduced-pressure state with a pressure of 10 kPa or more.

In accordance with a fifteenth aspect of the present invention, in the gas reforming device of any of the third to fourteenth aspect, a pulse width of said pulse voltages is 50 to 300 ns in terms of a half-width.

In accordance with a sixteenth aspect of the present invention, in the gas reforming device of any of the third to fifteenth aspect, a repetition number of said pulse voltages of said pulses is 1 kpps to several 10 kpps.

In accordance with a seventeenth aspect of the present invention, in the gas reforming device of any of the third to sixteenth aspect, said pulse voltages are generated by a pulse power supply using an SI thyristor.

In accordance with the present invention, the gas reforming device is provided, which is capable of processing the object with a low damage, and is capable of efficiently reforming the object.

The object, features, aspects and advantages of the present invention will become more apparent by the following detailed description and the accompanying drawings.

BRIEF DESCRIPTION OF THE DRAWINGS

FIG. 2 is a schematic cross-sectional view of gas reforming containers which the gas reforming device according to the first embodiment of the present invention includes.

FIG. 3 is views explaining formation of an ion sheath layer.

FIG. 6 is timing charts explaining operations of a pulse power supply.

FIG. 23 is a schematic cross-sectional view of an anode.
FIG. 24 is a schematic cross-sectional view of an anode.
FIG. 27 is a schematic cross-sectional view of an anode.
FIG. 28 is a schematic cross-sectional view of an anode.

FIG. 30 is schematic views explaining hydrophilicity of a surface of a sample.

DETAILED DESCRIPTION OF THE INVENTION

Figure 1:
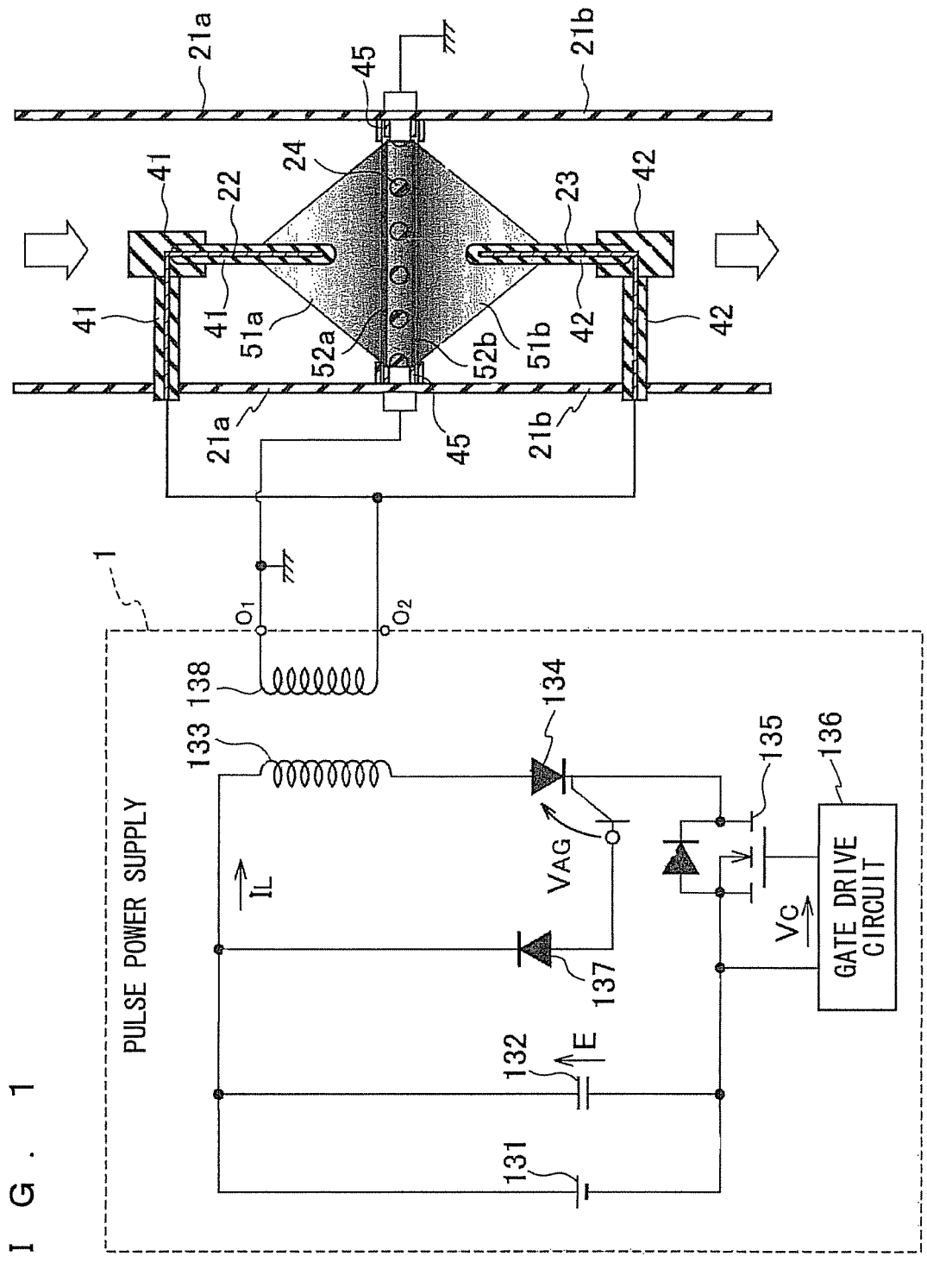
FIG. 1 is a schematic view of a gas reforming device according to a first embodiment of the present invention.

A description is made of embodiments of the present invention and a base (basic structure) of these with reference to the drawings. In the drawings, the same or similar reference numerals are assigned to the same or similar portions. However, the drawings are schematic views, and relationships between thicknesses and planar dimensions, ratios of thicknesses of the respective layers, and the like differ from actual ones. Hence, specific thicknesses and dimensions should be determined in consideration of the following description. Moreover, also among the drawings, portions in which relationships and ratios of mutual dimensions differ thereamong are included.

Note that the embodiments and the base of these, which are shown below, merely illustrate devices and methods, which embody the technical idea of the present invention, and the technical idea of the present invention does not limit materials, shapes, structures, arrangements and the like of constituent components to the following. A variety of alterations can be added to the technical idea of the present invention within the technical scope specified by items described in the scope of claims.

First Embodiment

Bipolar-Type Plasma Reformer

As shown in FIG. 1 and FIG. 2, a gas reforming device (plasma reformer) according to a first embodiment of the present invention includes: a first anode 22 and a second anode 23, which are arranged so as to be opposed to each other; and a common cathode 24 that is sandwiched between tip ends of the first anode 22 and the second anode 23 so as to be spaced apart therefrom, has a grid shape, has at least a surface thereof made of an insulator (dielectric), and includes grounding electrodes 45 on peripheral portions thereof. The grounding electrodes 45 made of conductor are brought into contact with end portions of ion sheath layers 52a and 52b spread on a surface of the common cathode 24, whereby a ground potential is given to the ion sheath layers 52a and 52b. Pulses with an equal polarity are applied to the first anode 22 and the second anode 23, and non-thermal equilibrium low-temperature plasma (hereinafter, simply referred to as "plasma") is generated between the first anode 22 and the common cathode 24 and between the second anode 23 and the common cathode 24. By this plasma, process gas is activated, and reform gas is generated. The process gas for generating the reform gas is introduced in a direction parallel to a direction of the shortest distances between the first anode 22 and the common cathode 24 and between the second anode 23 and the common cathode 24. The "reform gas" stands for gas in an active state as a whole, which includes not only a state immediately after the process gas is activated but also a state where, after the process gas is activated, a part of active species with a short lifetime has returned to a non-activated state from an activated state.

The first anode 22, the second anode 23 and the common cathode 24 are inserted into insides of gas reforming containers (chambers) 21a and 21b from outsides thereof. FIG. 1 and FIG. 2 illustrate the cylindrical gas reforming containers 21a and 21b in which cross sections are circular and shapes and sizes of the cross sections are uniform; however, the gas reforming containers 21 and 21b may have a spherical shape, may have a box shape in which a cross section is square or rectangular and a shape and size of the cross section are uniform, or may have other shapes.

Figure 31A:
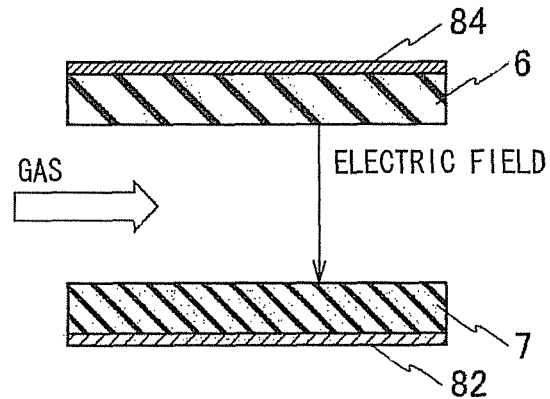
FIG. 31 is schematic views explaining directions where process gas flows.

A reason for having adopted an introduction direction of the process gas, which is as described above, is shown in FIG. 31. In a plasma reformer (hereinafter, referred to as a "parallel flat plate-type plasma reformer") including parallel flat plate-type reactors, as shown in FIG. 31(a), a plate-like anode 84 is provided on an upper side, a plate-like cathode 82 is provided on a lower side, a protection dielectric 6 is provided on a lower surface of the anode 84, and a protection dielectric 7 is provided on an upper surface of the cathode 82. In the parallel flat plate-type plasma reformer, as shown by an arrow, the process gas is flown in a direction perpendicular to a direction of an electric field between the anode 84 and the cathode 82, the process gas is activated (excited), and reform gas activated by plasma is jetted.

In the parallel flat plate-type plasma reformer, an activation effect for the process gas differs between an inlet side and outlet side of the gas, and the process gas is not effectively activated. This phenomenon becomes significant particularly in the case of ensuring, to be long, a length of the portion where the reformation is performed in order to generate a large amount of the reform gas. This is because, in the parallel flat plate-type reformer, there is no large change in a degree of the activation even if the process gas activated in the vicinity of the inlet side moves to the outlet side. When power of an applied pulse voltage is nevertheless increased in order to sufficiently activate the process gas, a state of an electric discharge is likely to shift to an arc discharge. When the arc discharge occurs, energy is consumed as heat, and not used for the activation of the process gas. Therefore, this method is unfit for generating radicals, which have high energy, by intensely activating the large amount of process gas.

Figure 31B:
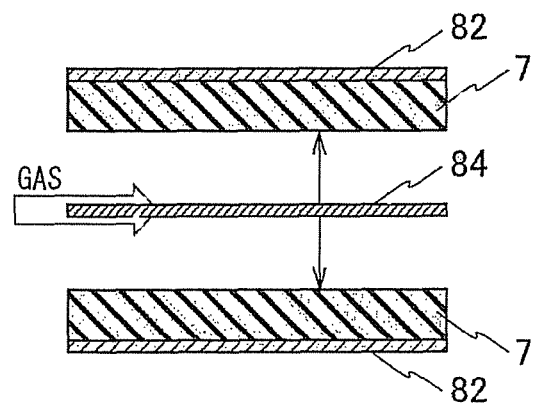
Figure 31C:
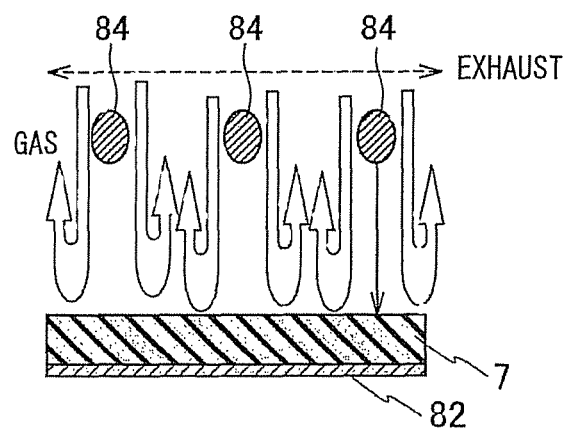

Owing to a similar reason, it is general that a plasma reformer (hereinafter, referred to as a "coaxial cylinder-type plasma reformer") including a coaxial cylinder-type reactor also ensures, to be long, the length of the portion where the reformation is performed in order to generate the large amount of reform gas, and is unfit for the effective activation of the process gas. FIG. 31(b) shows a coaxial cylinder-type plasma reformer, in which a cylindrical cathode 82 is provided on an outer circumferential surface of a cylindrical container 7 that functions as a dielectric protecting the cathode, and a bar-like anode 84 covered with a tubular dielectric (not shown) is provided on a cylindrical axis of a center of the container 7. Also in the coaxial cylinder-type plasma reformer, as shown by an arrow, the process gas is flown in the direction perpendicular to the direction of the electric field between the anode 84 and the cathode 82, and the reform gas activated by the plasma is jetted.

In order to effectively activate the process gas and to generate the reform gas, the gas reforming device according to the first embodiment of the present invention parallelizes the direction of the electric fields between the first anode 22 and the common cathode 24 and between the second anode 23 and the common cathode 24 and the direction where the process gas flows with each other. Note that a process pressure of the gas reforming device according to the first embodiment of the present invention is the atmospheric pressure. However, the process pressure may be set in a reduced pressure state, for example, at 10 kPa or less. In the gas reforming device according to the first embodiment of the present invention, as shown in FIG. 1 and FIG. 2, the gas reforming containers 21a and 21b are formed into a tubular shape such as a cylindrical shape, the process gas is introduced from one end of a flow passage in insides of the cylindrical gas reforming containers 21a and 21b, the process gas is flown through the flow passage, and surface treatment and reformation for a sample (processing target object) located in a direction where the reform gas is injected are performed by a remote plasma method of jetting the reform gas, which is activated by the plasma, from the other end of the flow passage toward a sample (not shown) placed on outsides of the gas reforming containers 21a and 21b.

Note that, in FIG. 1 and FIG. 2, the flow of the process gas is shown, in which the process gas is introduced from one end of the flow passage, which is located above the gas reforming containers 21a and 21b, and the reform gas activated by the plasma is jetted from the other end of the flow passage, which is located below the same. However, this flow of the process gas is illustratively shown, and the process gas just needs to flow in the direction parallel to such an electric field direction (direction of the shortest inter-electrode distances), and accordingly, on the contrary to the above description, the process gas may be introduced from one end of the flow passage, which is located below the gas reforming containers 21a and 21b, and the reform gas activated by the plasma may be jetted from the other end of the flow passage, which is located above the gas reforming containers 21a and 21b.

Though not shown, in FIG. 1 and FIG. 2, a straightening vane in which through holes formed of a plurality of tubules are arranged in a matrix may be provided above the gas reforming containers 21a and 21b. In such a way, the process gas, which is supplied from a tank (not shown) of the process gas through air feed pipes to the gas reforming containers 21a and 21b, passes via the straightening vane, and is thereby fed as a uniform flow in a shower form to the insides of the gas reforming containers 21a and 21b. The process gas fed in the shower form is activated by the plasma, and the reform gas activated by the plasma is exhausted to the below of the gas reforming containers 21a and 21b.

The process gas is selected in response to a usage purpose of the reform gas. Note that, as shown in Table 1, since dissociation energy of nitrogen ($N_2$) molecules is larger in comparison with those of other gas molecules, it has been heretofore difficult to generate stable nitrogen plasma; however, in the gas reforming device according to the first embodiment, it is possible to select nitrogen gas as the process gas. However, the "process gas" is not necessarily limited to the nitrogen gas. For example, for sterilization, disinfection and the like of the sample, the process gas may be gas of highly active elemental chlorine ($Cl_2$) or chloride, or may be highly active gas such as hydrogen peroxide and halide (fluoride, bromide, iodide or the like) other than the chloride. Moreover, the process gas may be other gas such as mixed gas of any of these highly active gases and the nitrogen gas, rare gas or the like. Besides these, in response to the usage purpose of the reform gas, such as the surface treatment, the process gas may be gas of air, oxygen ($O_2$) or an oxygen compound, carbon dioxide ($CO_2$), argon (Ar) or helium (He), and moreover, may be gas of so-called flon such as fluorocarbon (FC), chlorofluorocarbon (CFC), hydrochlorofluorocarbon (HCFC) and hydrofluorocarbon (HFC). Purity, dew point and the like of the process gas are selected in response to the usage purpose of the reform gas, such as the surface treatment. The gas reforming device of the first embodiment may be inserted into an air intake system of an internal combustion engine, and the gas reforming device of the first embodiment may be used in order to increase active species contained in the air.

TABLE 1

| | GAS MOLECULES | | | | | | | |
|---|---|---|---|---|---|---|---|---|
| | $F_2$ | $H_2O_2$ | OH | $N_2O$ | $O_2$ | $CO_2$ | NO | $N_2$ |
| ISOLATION ENERGY (eV) | 1.66 | 2.21 | 4.62 | 4.93 | 5.21 | 5.52 | 6.50 | 9.91 |

As shown in FIG. 2 in detail, the first anode 22 is coated with a tubular protection dielectric 41, and the second anode 23 is coated with a tubular protection dielectric 42. For the coating for the first anode 22 with the protection dielectric 41 and the coating for the second anode 23 with the protection dielectric 42, a ceramic coating method, a gel casting method, a glass method and the like are used. The protection dielectric 41 and the protection dielectric 42 are inserted into the insides of the gas reforming containers 21a and 21b from the outsides thereof through a feed member (not shown) made of an insulator and a feed member (not shown) made of an insulator, respectively.

For a material of the first anode 22 and the second anode 23, varieties of heat-resistant metals (high-melting-point metals) and heat-resistant alloys, which are excellent in durability against the plasma, are used. The heat-resistant metals typically include tungsten (W), molybdenum (Mo), titanium (Ti), chromium (Cr), zirconium (Zr), platinum (Pt), palladium (Pd), hafnium (Hf), tantalum (Ta), ruthenium (Ru) and the like. A nickel-chromium (Ni—Cr) alloy is typical as the heat-resistant alloys; however, the heat-resistant alloys may be a heat-resistant alloy in which at least any of iron (Fe), aluminum (Al), molybdenum (Mo), cobalt (Co), silicon (Si) and the like is further contained in the nickel-chromium alloy. Moreover, a well-known heat-resistant alloy made of two types or more of metals selected from W, Mo, Mn, Ti, Cr, Zr, Fe, Pt, Pd, silver (Ag), copper (Cu) and the like is also used.

The first anode 22 and the second anode 23 have a bar shape. The tip ends of the first anode 22 and the second anode 23 are located in the inside of the flow passage of the process gas. In the case where the first anode 22 and the second anode 23 are provided one by one, it is desirable that the tip ends of the first anode 22 and the second anode 23 be located in the vicinity of a center of the flow passage of the process gas. Among the tip ends of the first anode 22 and the second anode 23 and the common cathode 24, the plasma is generated by application of a pulse voltage. The first anode 22 and the second anode 23 have the bar shape, whereby the first anode 22 and the second anode 23 are suppressed from inhibiting the flow of the process gas. In the first anode 22 and the second anode 23, it is only the tip ends thereof approaching the common cathode 24 that contribute to the generation of the plasma, and accordingly, portions thereof apart from the tip ends may have a shape other than the bar shape as long as the flow of the process gas is not inhibited. The tip ends of the first anode 22 and the second anode 23 are spaced apart from the common cathode 24 in a direction parallel to the direction where the process gas flows.

It is preferable that a thickness (diameter) of the first anode 22 and the second anode 23 be selected at a value as thin as possible, for example, within an approximate range from 100 to 1000 μm. This is because, as the thickness of the first anode 22 and the second anode 23 is thinner, the electric field concentrates, electron injection from the common cathode 24 becomes easy, a concentration effect of the electric field also becomes high, an electric discharge becomes easy, and stability and uniformity of the electric discharge are enhanced. A lower limit of the thickness of the first anode 22 and the second anode 23 actually depends on a manufacturing technology for the first anode 22 and the second anode 23. Therefore, from an industrial viewpoint, the thickness of the first anode 22 and the second anode 23 becomes approximately 100 to 1000 µm.

For a material of the columnar protection dielectrics 41 and 42, a resin material such as a variety of organic synthetic resins or an inorganic material such as ceramics and glass is used. As the organic resin material, phenol resin, polyester resin, epoxy resin, polyimide resin, fluorine resin or the like is used. As the inorganic material, the ceramics or the glass is generally used. As a material of the ceramics, alumina ($Al_2O_3$), mullite ($3Al_2O_3 \cdot 2SiO_2$), beryllia (BeO), aluminum nitride (AlN), silicon carbide (SiC), cordierite ($Mg_2Al_3$ ($AlSi_5O_{18}$)), magnesia (MgO), spinel ($MgAl_2O_4$), silica ($SiO_2$) or the like is used. Though depending also on the thickness of the first anode 22 and the second anode 23, typically, a thickness of the tubular protection dielectrics 41 and 42 just needs to be selected at a value larger than the thickness of the first anode 22 and the second anode 23, for example, within an approximate range from 0.1 to 0.5 mm, preferably, from 0.8 to 1.5 mm. Specifically, if the thickness of the first anode 22 and the second anode 23 is approximately 9 to 150 µm, the thickness of the protection dielectrics 41 and 42 is selected at a value of approximately 0.1 to 0.5 mm in consideration of insulation durability.

A bar-like first anode structure 56 including the protection dielectric 41 and the first anode 22 is bent into an L-shape, and includes: a first bar-like portion 54 including a tip end thereof; and a second bar-like portion 55 extended across the inside and outside of the gas reforming container 21a. The first bar-like portion 54 is extended in a direction that is parallel to the direction where the process gas flows and is perpendicular to the surface of the common cathode 24. The second bar-like portion 55 is extended in a direction that is perpendicular to the direction where the process gas flows and is parallel to the surface of the common cathode 24. A bar-like second anode structure 59 including the protection dielectric 42 and the second anode 23 is also bent into an L-shape, and includes: a first bar-like portion 57 including a tip end thereof; and a second bar-like portion 58 extended across the inside and outside of the gas reforming container 21b. The first bar-like portion 57 is extended in a direction that is parallel to the direction where the process gas flows and is perpendicular to the surface of the common cathode 24. The second bar-like portion 58 is extended in a direction that is perpendicular to the direction where the process gas flows and is parallel to the surface of the common cathode 24.

Figure 4A:
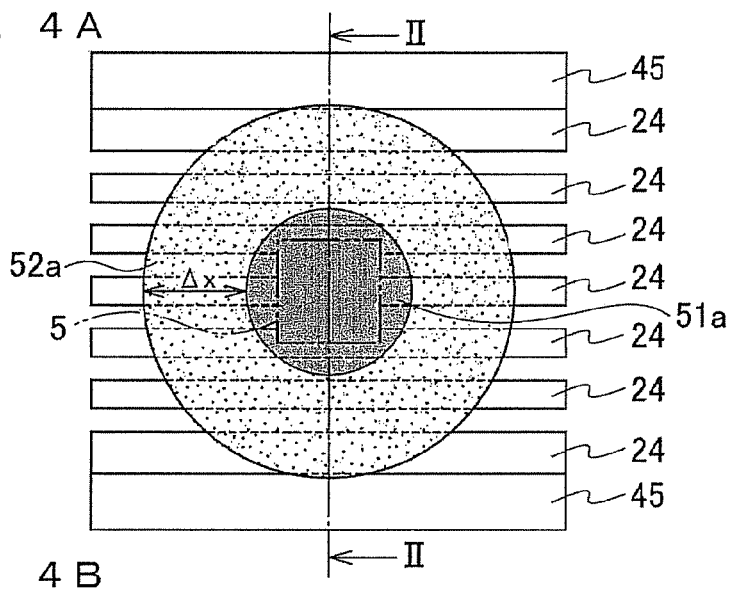
FIG. 4 is schematic plan views showing a planar structure of common cathodes.
Figure 4B:
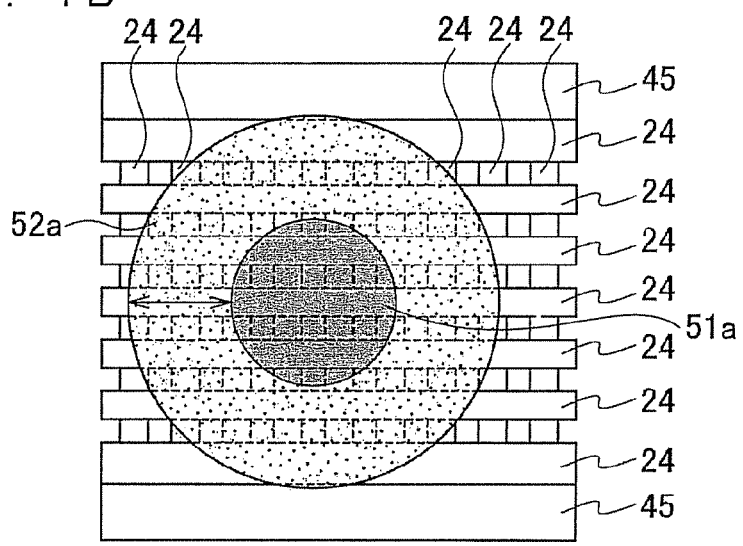
Figure 4C:
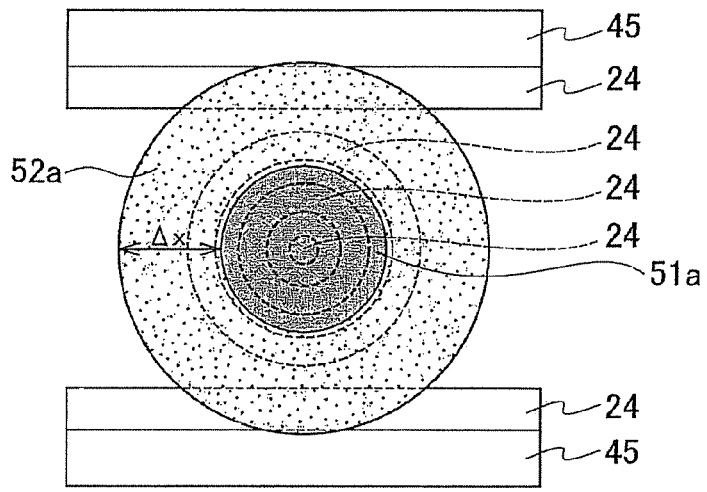

A planar structure of the common cathode 24 provided on a cross section of the flow passage may be, as illustrated in FIGS. 4(a), 4(b) and 4(c) and the like, a parallel bar structure having band-like openings, in which a plurality of bar bodies are arrayed in one direction at an interval, a quadrangular grid structure having quadrangular openings, in which a plurality of bar bodies are arrayed in two directions at intervals, a concentric structure having annular or circular openings, in which a plurality of annular bodies are concentrically arranged, and the like, and in addition thereto, may be a honeycomb structure having regular hexagonal openings, a triangular grid structure having triangular openings, in which a plurality of bar bodies are arrayed in three directions at intervals, a perforated structure in which holes (through holes) having a circular, triangular, quadrangular, pentagonal, and hexagonal shape or the like are drilled into a plate, and the like, and a variety of structures are adopted (FIG. 2 corresponds to a cross-sectional view of FIG. 4(a) when viewed in a II-II direction). More in general, the common cathode 24 includes an opening-arrayed body having a planar structure in which openings through which the process gas passes are arrayed. It is desirable that the openings be arrayed over the whole of the cross-section of the flow passage of the process gas in order not to inhibit the flow of the process gas, and it is desirable that the openings be uniformly arrayed over the whole of the cross section of the flow passage of the process gas in order not to disturb uniformity of the flow of the process gas. Also for a material of an insulator that configures the opening-arrayed body of the common cathode 24, the resin material such as the variety of organic synthetic resins or the inorganic material such as the ceramics and the glass is used. As the organic resin material, the phenol resin, the polyester resin, the epoxy resin, the polyimide resin, the fluorine resin or the like is used, and as the inorganic material, the ceramics or the glass is generally used. As the material of the ceramics, the alumina, the mullite, the beryllia, the aluminum nitride, the silicon carbide, the cordierite, the magnesia, the spinel, the silica, zirconia ($ZrO_2$) or the like is used.

A size of a space where the electric discharge is generated is determined in response to the sample. A size of a distance between such electric discharge electrodes which generate the electric discharge is also determined in response to a type, pressure, flow rate and the like of the process gas, and to contents of the process, such as a peak voltage and maximum rise rate of the pulse voltage; however, is determined at approximately 3 mm to 40 mm.

A pulse power supply 1 shown in FIG. 1 applies pulse voltages, in which polarities are equal to each other, and the maximum rise rate dV/dt is 100 to 600 kV/µs or more (maximum: 1000 kV/µs), individually to between the first anode 22 and the common cathode 24 and to between the second anode 23 and the common cathode 24 in the atmospheric pressure. The maximum rise rate dV/dt of the pulse voltages applied individually to between the first anode 22 and the common cathode 24 and to between the second anode 23 and the common cathode 24 is 100 kV/µs or more, whereby, as shown in FIG. 3(a), the ion sheath layers 52a and 52b in which a thickness Δd is thin are formed on upper surface side and lower surface side of the common cathode 24, and high-density ions and radicals, which are necessary for the reformation, are generated.

In the case where the maximum rise rate dV/dt of the pulse voltages applied individually to between the first anode 22 and the common cathode 24 and to between the second anode 23 and the common cathode 24 is less than several 10 kV/µs, as shown in FIG. 3(b), the thickness Δd of the ion sheath layers 52a and 52b formed on the upper surface side and lower surface side of the common cathode 24 shown in FIG. 2 is thickened, and densities of the ions and the radicals are lowered, and accordingly, efficiency of the reformation is low.

In the case where the electric discharge is generated in the atmospheric pressure, and an inter-discharge electrode distance between the anode 84 and the cathode 82 is 5 to 20 mm, in the case where, as shown in FIG. 3(a), the pulse width of the pulse voltage applied to between the anode 84 and the cathode 82 is a pulse width as short as approximately 50 to 300 ns in terms of a half-width, and the maximum rise rate dV/dt of the pulse voltage is roughly 100 to 600 kV/µs or more, then the ion sheath layer 52 that is thin is formed on the upper surface side of the cathode 82, and high-density ions and radicals are generated. Meanwhile, as shown in FIG. 3(b), in the case where the pulse width is a pulse width of approximately 1 to 10 µs in terms of the half-width, and the maximum rise rate dV/dt of the pulse voltage is roughly 100 kV/µs or less, then the ion sheath layer 52 that is thick is formed on the upper surface side of the cathode 82, and accordingly, the densities of the generated ions and radicals become low.

In FIG. 3(a), the repetition number of pulses is selected within a range where the arc discharge is not generated; however, is preferably approximately 1 kpps to several 10 kpps. In the case where the maximum rise rate dV/dt of the pulse voltage is roughly 100 to 600 kV/µs or more, a glow discharge by ionization of the process gas is brought about, which is caused by an effect in which secondary electrons emitted when positive ions collide with the cathode 82 ionize molecules of the process gas and generate new positive ions, and by an impact ionization effect by the application of the pulse voltage with the high maximum rise rate dV/dt.

In the case where the maximum rise rate dV/dt of the pulse voltage is roughly 100 to 600 kV/µs or more (maximum: 1000 kV/µs), and the pulse width $\Delta t$ is roughly 50 ns, growth of a plasma region made of streamers going from the anode 84 to the cathode 82 begins. Then, in the case where the pulse width $\Delta t$ is roughly 50 to 100 ns, the growth of the plasma region made of the streamers is ended at an initial stage where plasma regions made of short streamers are dispersed between the anode 84 and the cathode 82. Meanwhile, in the case where the pulse width $\Delta t$ is roughly 100 to 300 ns, the plasma region made of the streamers grows fully, and a state is brought where a plasma region made of branched long streamers is present between the anode 84 and the cathode 82.

In the gas reforming device according to the first embodiment of the present invention, a streamer discharge in which the electric discharge is stopped at an initial stage of the growth of the plasma region made of the streamers is used in order that the anode 84 and the cathode 82 cannot be conducted to each other by the matter that the growth of the plasma region made of the streamer is advanced. This is because, if the streamer discharge excellent in uniformity of the electric discharge is used, then the reformation can be carried out uniformly. Moreover, when the pulse width $\Delta t$ roughly reaches 400 ns to 1 µs or more, a local current concentration occurs owing to an excessively long application time of the pulse voltage, and the arc discharge is finally brought about. These numeric values are changed depending on the shape of the reactor. The pulse voltage with the high maximum rise rate dV/dt, which does not reach the arc discharge, is applied to the process gas, whereby highly reactive active species which are activated more intensely and have high energy are generated, and highly reactive reform gas is generated. In the present invention, streamer discharge realization conditions where the pulse voltage with the pulse width, which does not cause the arc discharge, is obtained is selected in response to the shape of the reactor so that an appropriate amount of the active species can be generated as shown in FIG. 3(a) after the pulse voltage with the high maximum rise rate dV/dt is applied.

In FIGS. 4(a), 4(b) and 4(c), the planar structures of the common cathode 24 applied to the gas reforming device according to the first embodiment are illustrated. In FIGS. 4(a), 4(b) and 4(c), states are shown, where the ion sheath layer 52a is expanded outward by a width $\Delta x$ from a central plasma region 51a made of the streamers. The common cathode 24 includes the grounding electrodes 45 on a peripheral portion of the flow passage of the process gas, and the grounding electrodes 45 are electrically connected to the ion sheath layer 52a, which is expanded outward by the width $\Delta x$, on the peripheral portion of the flow passage of the process gas, whereby the ion sheath layer 52a is grounded. In the common cathode 24 applied to the gas reforming device according to the first embodiment, at least the surface thereof just needs to be made of the insulator (dielectric), and accordingly, the common cathode 24 may include a conductor such as metal in an inside thereof.

Figure 5:
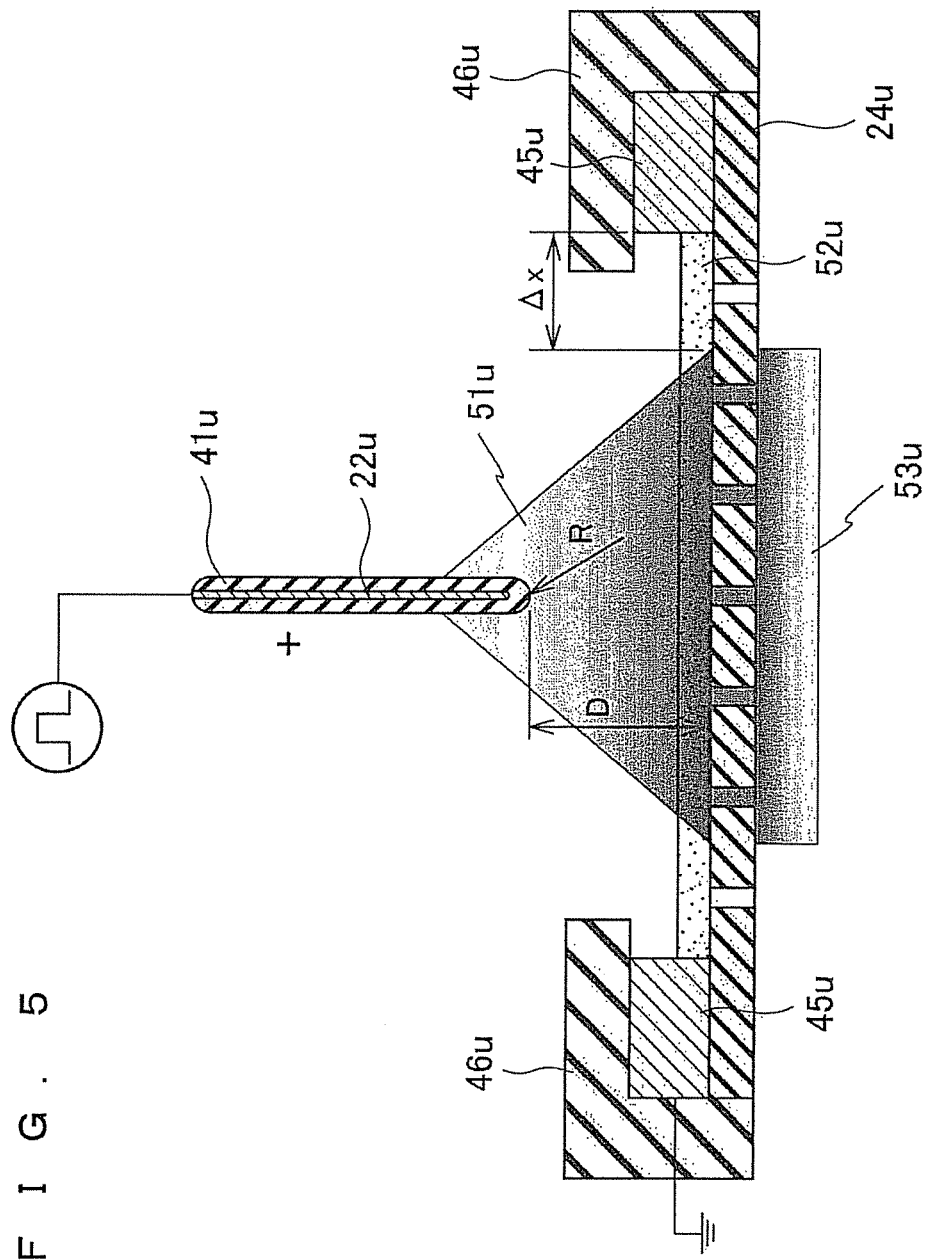
FIG. 5 is a schematic cross-sectional view of a base (basic structure) of first and second embodiments of the present invention.

FIG. 5 shows a schematic structure of principal portions of a gas reforming device (unipolar-type plasma reformer) serving as a base (basic structure) of first and second embodiments of the present invention. As shown in FIG. 5, the unipolar-type plasma reformer includes: an anode 22u; and a cathode 24u that is arranged opposite to a tip end of the anode 22u, has a grid shape, has at least a surface thereof made of an insulator, and includes grounding electrodes 45u on peripheral portions thereof. The grounding electrodes 45u are brought into contact with end portions of an ion sheath layer 52u spread on the surface of the cathode 24u, whereby a ground potential is given to the ion sheath layer 52u, the process gas introduced in a direction parallel to the direction of such a shortest inter-electrode distance between the anode 22u and the cathode 24u is activated by plasma formed between the anode 22u and the cathode 24u, and the reform gas is generated. In the unipolar-type plasma reformer, the pulse voltage is applied to between one anode 22u and one cathode 24u, and a plasma region 51u made of the streamers is formed by a unipolar-type discharge between the anode 22u and the cathode 24u.

In the case of the unipolar-type discharge generated in the base (basic structure) of the first and second embodiments of the present invention, the ion sheath layer 52u is spread outward by the width $\Delta x$ from the central plasma region 51u made of the streamers, and accordingly, the ion sheath layer 52u is grounded in such a manner that the grounding electrodes 45u are electrically connected to the expanded ion sheath layer 52u. By the grounding of the ion sheath layer 52u by the grounding electrodes 45u, wasteful scattering of the electric discharge to other than the cathode 24 is prevented, and high energy is injected to between the anode 22u and the cathode 24u. The cathode 24u just needs to have the grid shape, and at least the surface thereof just needs to be made of the insulator, and accordingly, a conductor such as metal may be included in an inside thereof.

In FIG. 5, illustration of a gas reforming containers is omitted; however, in a similar way to the structure shown in FIG. 2, the anode 22u and the cathode 24u are arranged in an inside of a cylindrical gas reforming container, the process gas is introduced from one end of a flow passage, and the reform gas activated by the plasma is jetted from other end of the flow passage. At this time, arrangement (positional relationship) of the anode 22u, the cathode 24u and the gas reforming container is determined so that the process gas can flow in the direction parallel to the direction (shortest inter-electrode distance direction) of the electric field.

In this specification, as opposed to the "unipolar-type discharge" shown in FIG. 5, the discharge, which gives the ground potential to the common cathode 24, applies the pulse voltages in which the polarities are equal to each other to the first anode 22 and the second anode 23, and generates the plasmas individually between the first anode 22 and the common cathode 24 and between the second anode 23 and the common cathodes 24, is referred to as a "bipolar-type discharge".

The reason why the ranges of the pulse width $\Delta t$ and maximum rise rate dV/dt of the pulse voltage are described as "roughly" in the above-mentioned description is that these sometimes become wider than the above-mentioned ranges depending on a specific configuration and process conditions of the gas reforming device, such as intervals between the first anode 22 and the common cathode 24 and between the second anode 23 and the common cathode 24, structures of the first anode 22, the second anode 23 and the common cathode 24, and a pressure of the process gas. Hence, whether or not the electric discharge has become the streamer discharge should be determined not only based on the pulse width Δt and maximum rise rate dV/dt of the pulse voltage but also by observing the actual electric discharge.

In the above-mentioned description, a schematic voltage waveform of the pulse voltages is premised on the time of no load. This is because, even if the pulse power supply 1 is operated under the same conditions, if the specific configuration such as the intervals between the first anode 22 and the common cathode 24 and between the second anode 23 and the common cathode 24 and the structures of the first anode 22, the second anode 23 and the common cathode 24 is changed, then the schematic voltage waveform of the pulse voltages applied to between the first anode 22 and the common cathode 24 and to between the second anode 23 and the common cathode 24 come to differ.

Figure 7:
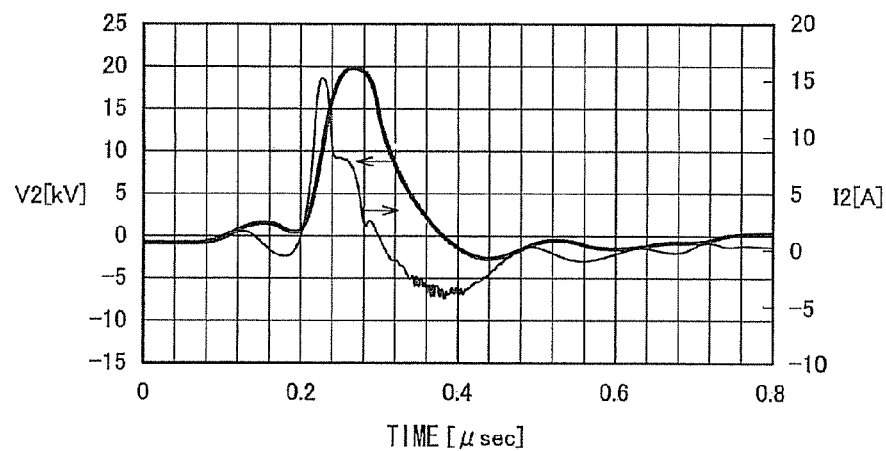
FIG. 7 is a diagram showing examples of a voltage waveform and current waveform of an electric pulse which the pulse power supply outputs.

The pulse power supply 1 repeatedly applies the pulse voltages, which cause the streamer discharge without causing the arc discharge, between the first anode 22 and the common cathode 24, and between the second anode 23 and the common cathode 24. Specifically, the pulse power supply 1 repeatedly applies the pulse voltages with the pulse width of 50 to 300 ns in terms of the half-width between the first anode 22 and the common cathode 24 and between the second anode 23 and the common cathode 24. Example of a voltage waveform of the pulse voltages which the pulse power supply 1 applies between the first anode 22 and the common cathode 24 and between the second anode 23 and the common cathode 24 and example of a current waveform of a current flowing when the pulse voltages are applied are shown in FIG. 7. In FIG. 7, changes of a voltage V2 of each pulse voltage and the current I2 flowing when the pulse voltage is applied (axes of ordinates) with respect to a time (axis of abscissas) are shown, and the pulse width has become approximately 100 ns in terms of the half-width.

For the pulse power supply 1, it is desirable to adopt an inductive energy storage-type power supply circuit (hereinafter, referred to as an "IES circuit") shown in FIG. 1 in which a static induction-type thyristor (hereinafter, referred to as a "SI thyristor") is used. The IES circuit performs turn off by using an opening switch function of the SI thyristor as well as a closing switch function thereof, and by the turn off concerned, generates a high voltage between a gate and anode of the SI thyristor. Note that details of the IES circuit are described in "Extremely Short Pulse Generation Circuit (IES Circuit) by SI Thyristor", by IIDA Katsuji and SAKUMA Takeshi, Lecture Collection of SI Device Symposium (2002).

A description is made of a configuration of the pulse power supply 1 with reference to FIG. 1. The pulse power supply 1 includes a low-voltage direct-current power supply 131. A voltage E of the low-voltage direct-current power supply 131 is permitted to be significantly lower than the peak voltage of the pulse voltage which the pulse power supply 1 generates. For example, even if a peak voltage generated on both ends of a primary winding 133 reaches several kilovolts, the voltage E of the low-voltage direct-current power supply 131 is permitted to be several ten volts. A lower limit of the voltage E is decided at a latching voltage of an SI thyristor 134 to be described later or more. The pulse power supply 1 is capable of using the low-voltage direct-current power supply 131 as an electric energy source, and accordingly, is constructible to be compact at low cost. The pulse power supply 1 includes a capacitor 132 connected in parallel to the low-voltage direct-current power supply 131. The capacitor 132 apparently lowers impedance of the low-voltage direct-current power supply 131, and thereby strengthens an electric discharge capability of the low-voltage direct-current power supply 131.

Moreover, the pulse power supply 1 includes the primary winding 133, the SI thyristor 134, a MOSFET 135, a gate drive circuit 136 and a diode 137. The primary winding 133 is inductively coupled to a secondary winding 138 connected between a high voltage output terminal $O_2$ and a ground terminal $O_1$, and configures a step-up transformer. A turns ratio of the primary winding 133 and the secondary winding 138 is decided by a required electric discharge voltage. The secondary winding inductively coupled to the primary winding 133 may be increased to two, the anode 22 may be connected to one of the secondary windings, and the anode 23 may be connected to the other secondary winding.

In the pulse power supply 1 shown in FIG. 1, a positive electrode of the low-voltage direct-current power supply 131 and one end of the primary winding 133 are connected to each other, the other end of the primary winding 133 and an anode of the SI thyristor 134 are connected to each other, the anode of the SI thyristor 134 and a drain of the FET 135 are connected to each other, and a source of the FET 135 and a negative electrode of the low-voltage direct-current power supply 131 are connected to each other. Moreover, in the pulse power supply 1, the gate of the SI thyristor 134 and an anode of the diode 137 are connected to each other, and a cathode of the diode 137 and one end (positive electrode of the low-voltage direct-current power supply 131) of the primary winding 133 are connected to each other. The gate drive circuit 136 is connected to the gate and source of the FET 135.

The SI thyristor 134 is capable of turning on and turning off in response to a gate signal. The FET 135 is a switching element in which a conduction state between a drain and a source is changed in response to a gate signal $V_C$ given from the gate drive circuit 136. It is desirable that an ON-voltage or ON-resistance of the FET 135 be low. Moreover, a withstand voltage of the FET 135 is required to be higher than the voltage E of the low-voltage direct-current power supply 131. The diode 137 is provided in order to inhibit a current flowing in the case of giving a positive bias to the gate of the SI thyristor 134, that is, in order that the SI thyristor 134 cannot be current driven in the case of giving the positive bias to the gate of the SI thyristor 134.

Subsequently, a description is made of operations of the pulse power supply 1 with reference to FIG. 6. In order from the above, FIG. 6 shows: (a) a change of the gate signal $V_C$, which is given to the FET 135, with respect to the time (axis of abscissas); (b) a change of a conduction state of the SI thyristor 134 with respect to the time (axis of abscissas); (c) a change of the current $I_L$ flowing through the primary winding 133 with respect to the time (axis of abscissas); (d) a change of the voltage $V_L$, which is generated on both ends of the primary winding 133, with respect to the time (axis of abscissas); and (e) a change of the voltage $V_{AG}$ (axis of ordinates) between the anode and gate of the SI thyristor 134 with respect to the time (axis of abscissas).

(A) First, as shown in FIG. 6(a), when the gate signal $V_C$ is switched from OFF to ON at a time $t_0$, the drain and source of the FET 135 turn to the conduction state. In such a way, the gate of the SI thyristor 134 is positively biased with respect to the anode thereof, and accordingly, as shown in FIG. 6(b), the anode and cathode (A-K) of the SI thyristor 134 turn to the conduction state, and as shown in FIG. 6(c), the current $I_L$ starts to be increased.

(B) When the gate signal $V_C$ is switched from ON to OFF as shown in FIG. 6(a) at around a time $t_1$ when the current $I_L$ reaches the peak value $I_{LP}$, the drain and source of the FET 135 turn to a non-conduction state, and as shown in FIG. 6(b), the anode and gate (A-G) of the SI thyristor 134 turn to the conduction state. In such a way, from a time $t_2$ to a time $t_3$, in synchronization with an expansion of a depletion layer in the SI thyristor 134 as shown in FIG. 6(*b*), the current $I_L$ is reduced as shown in FIG. 6(*c*), and the voltage $V_L$ shown in FIG. 6(*d*) and the voltage $V_{AG}$ shown in FIG. 6(*e*) suddenly rise.

(C) Then, at the time $t_3$, the voltage $V_L$ shown in FIG. 6(*d*) and the voltage $V_{AG}$ shown in FIG. 6(*e*) reach the peak value $V_{LP}$ and the peak value $V_{AGP}$, respectively, and as shown in FIG. 6(*c*), an orientation of the current $I_L$ is inverted. Thereafter, during a period from the time $t_3$ to a time $t_4$, which is as shown in FIG. 6(*b*), in synchronization with reduction of the depletion layer in the SI thyristor 134, the current $I_L$ is increased as shown in FIG. 6(*c*), and the voltage $V_L$ shown in FIG. 6(*d*) and the voltage $V_{AG}$ shown in FIG. 6(*e*) are suddenly lowered.

(D) Then, at the time $t_4$, when the SI thyristor 134 turns to the non-conduction state as shown in FIG. 6(*b*), the current $I_L$ is reduced toward a time $t_5$ as shown in FIG. 6(*c*), and the voltage $V_L$ shown in FIG. 6(*d*) and the voltage $V_{AG}$ shown in FIG. 6(*e*) become zero.

First Modification Example

Figure 8:
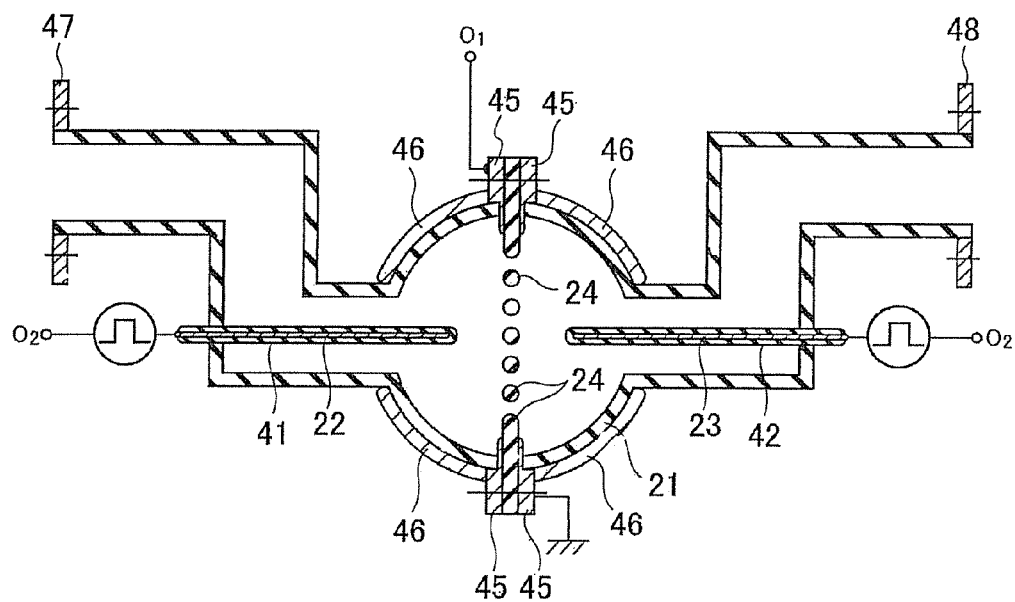
FIG. 8 is a schematic cross-sectional view of a gas reforming device according to a first modification example of the first embodiment of the present invention.

As shown in FIG. 8, in a similar way to the structure shown in FIG. 2, a gas reforming device according to a first modification example of the first embodiment of the present invention includes: a first anode 22 and a second anode 23, which are arranged opposite to each other; and a common cathode 24 including a grid-like insulator sandwiched between respective tip ends of the first anode 22 and the second anode 23 so as to be spaced apart therefrom, and including grounding electrodes 45 on peripheral portions thereof. A ground potential is given to the common cathode 24, pulse voltages in which polarities are equal to each other are applied to the first anode 22 and the second anode 23, and bipolar-type plasmas are generated individually between the first anode 22 and the common cathode 24 and the second anode 23 and the common cathode 24.

The first anode 22 and the second anode 23 are inserted into a portion circular in cross section in a center portion of a gas reforming container 21, which have L-pipes connected to both sides thereof, from a direction parallel to the direction where the process gas flows. The common cathode 24 is inserted into the portion circular in cross section in the center portion of the gas reforming container 21. In the case of adopting the gas reforming containers 21*a* and 21*b* shown in FIG. 1 and FIG. 2, in which the flow passage of the process gas is linearly extended, in order to pull out the first electrode structure 56 and the second electrode structure 57 to the outsides of the gas reforming containers 21*a* and 21*b* while parallelizing the first bar-like portions 54 and 57 including the tip ends to the direction where the process gas flows, the first electrode structure 56 and the second electrode structure 57 are bent at boundaries between the first bar-like portions 54 and 57 and the second bar-like portions 55 and 58, and are inserted into the flow passage from the direction perpendicular to the direction where the process gas flows. As opposed to this, in the case of adopting the gas reforming container 21 shown in FIG. 8, in which the flow passage of the process gas is bent, it is not necessary to bend the anodes 22 and 23 (anode structures) coated with the protection dielectrics 41 and 42. In such a way, a structure of the anode structures becomes simple. The gas reforming device shown in FIG. 8 is different from the gas reforming device shown in FIG. 2 in that the process gas is introduced through the left-side L-pipe into a left side of the portion circular in cross section in the center portion, that the reform gas activated by the bipolar-type plasmas is jetted through the right-side L-pipe from a right side of the portion circular in cross section in the center portion, and that a surface of a sample (not shown) placed on the outside of the gas reforming container 21 is treated. Others are substantially similar to those of the gas reforming device shown in FIG. 2, and accordingly, a duplicate description is omitted.

Second Modification Example

Figure 9:
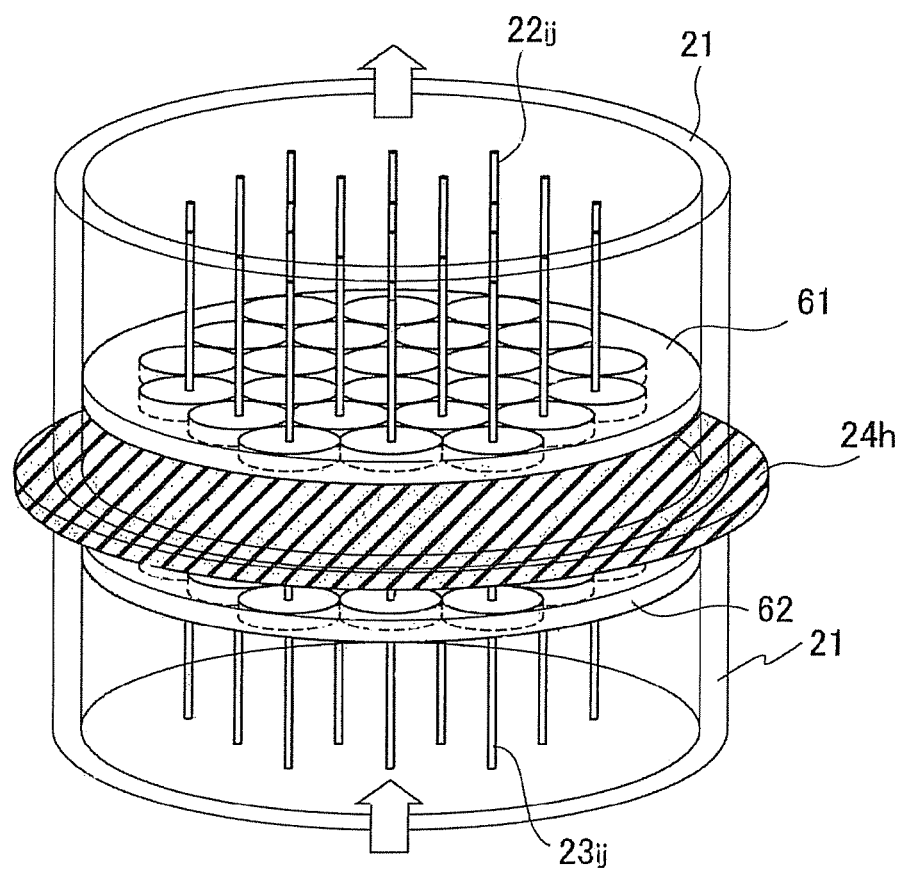
FIG. 9 is a schematic bird's-eye view of a gas reforming device according to a second modification example of the first embodiment of the present invention.
Figure 10:
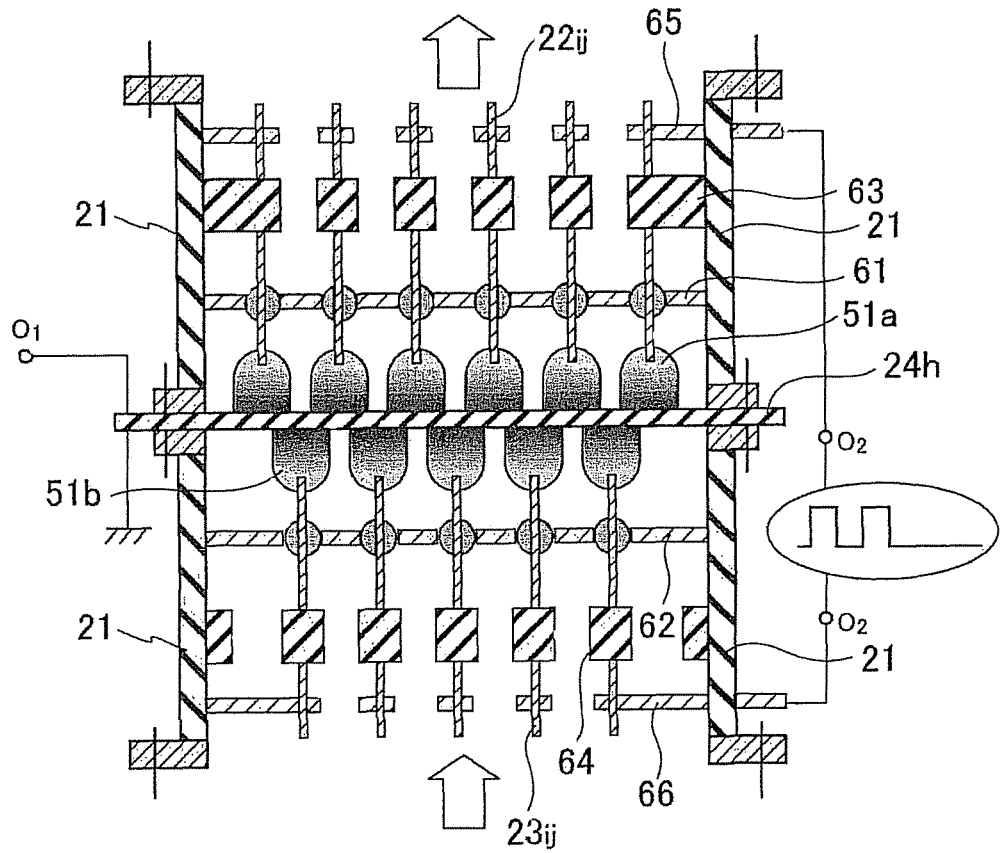
FIG. 10 is a schematic cross-sectional view of the gas reforming device according to the second modification example of the first embodiment.

As shown in FIG. 9 and FIG. 10, in a similar way to the gas reforming device shown in FIG. 2, a gas reforming device according to a second modification example of the first embodiment of the present invention includes: a plurality of first anodes $22_{ij}$ and a plurality of second anodes $23_{ij}$, which are arranged opposite to each other; and a common cathode 24*h* that is sandwiched between respective tip ends of the plurality of first anodes $22_{ij}$ and the plurality of second anodes $23_{ij}$ so as to be spaced apart therefrom, includes a grid-like insulator, and includes grounding electrodes (not shown) on peripheral portions thereof. The plurality of first anodes $22_{ij}$ and the plurality of second anodes $23_{ij}$ have a bar shape, and are arranged parallel to one another. The respective tip ends of the plurality of first anodes $22_{ij}$ and the plurality of second anodes $23_{ij}$ are spaced apart from surfaces of the common cathode 24 by the same distance. The plurality of first anodes $22_{ij}$ and the plurality of second anodes $23_{ij}$ are fixed to the inside of the gas reforming container 21 by holding members 63 made of an insulator. The plurality of first anodes $22_{ij}$ are electrically connected to the high voltage output terminal $O_2$ through a power feed member 65, and the plurality of second anodes $23_{ij}$ are electrically connected to the high voltage output terminal $O_2$ through a power feed member 66. The ground potential is given to the common cathode 24*h*, and the pulse voltages in which the polarities are equal to each other are applied to the plurality of first anodes $22_{ij}$ and the plurality of second anodes $23_{ij}$, and the bipolar-type plasmas are generated individually between the plurality of first anodes $22_{ij}$ and the common cathode 24*h* and between the plurality of second anodes $23_{ij}$ and the common cathode 24*h*.

Figure 11:
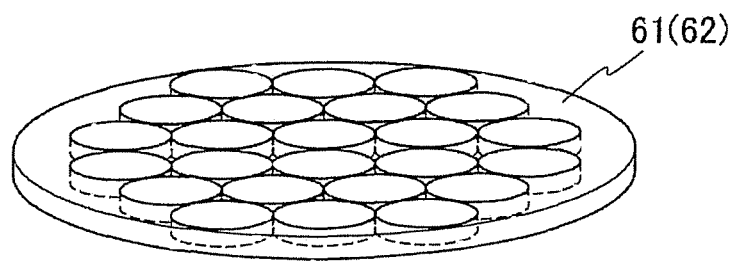
FIG. 11 is a schematic bird's-eye view of an insulating plate which the gas reforming device according to the second modification example of the first embodiment includes.
Figure 12A:
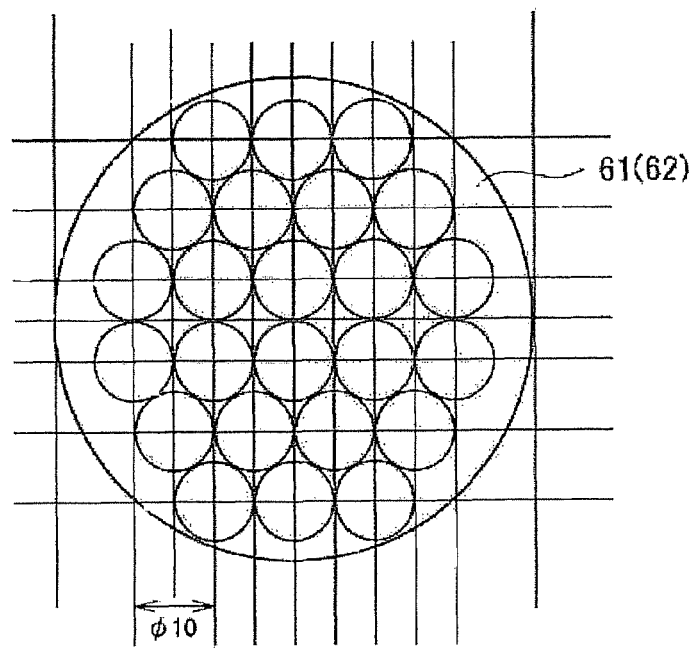
FIG. 12 is views of the insulating plate.
Figure 12B:
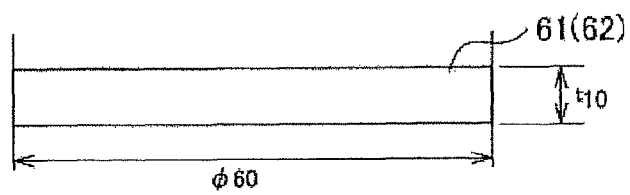
Figure 13:
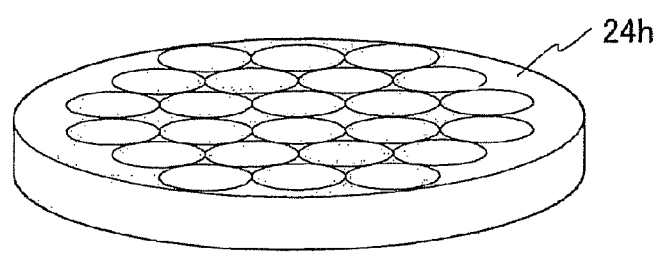
FIG. 13 is a schematic bird's-eye view of a common cathode which the gas reforming device according to the second modification example of the first embodiment includes.

The plurality of first anodes $22_{ij}$ are arranged at center portions of respective holes of an insulating plate 61 shown in FIG. 11 and FIG. 12, in which a plurality of circular holes (through holes) are opened, and are then separated from one another, and the plurality of second anodes $23_{ij}$ are arranged at center portions of respective holes of an insulating plate 62 shown in FIG. 11 and FIG. 12, in which a plurality of circular holes are opened, and are then separated from one another. As illustrated in FIG. 13, a planar structure of the common cathode 24*h* is an insulating plate in which a plurality of circular holes (through holes) are opened. A structure of the second modification example realizes a cathode hollow-type reformer that generates the electrode injection uniformly on the entire surface.

The plurality of first anodes $22_{ij}$ and the plurality of second anodes $23_{ij}$ and the common cathode 24*h* are housed in the inside of the cylindrical gas reforming container 21. As shown by arrows, the process gas is introduced upward from one end of the flow passage, which is located at a bottom portion of the gas reforming container 21 in FIG. 9 and FIG. 10, the reform gas activated by the bipolar-type plasmas is jetted from the other end of the flow passage, which is located at an upper portion of the gas reforming container 21, to a sample (not shown) placed above the gas reforming container 21, and a surface of the sample is treated. Others are substantially similar to those of the gas reforming container shown in FIG. 2, and accordingly, a duplicate description is omitted.

Second Embodiment

Double Unipolar-Type Plasma Reformer

Figure 14:
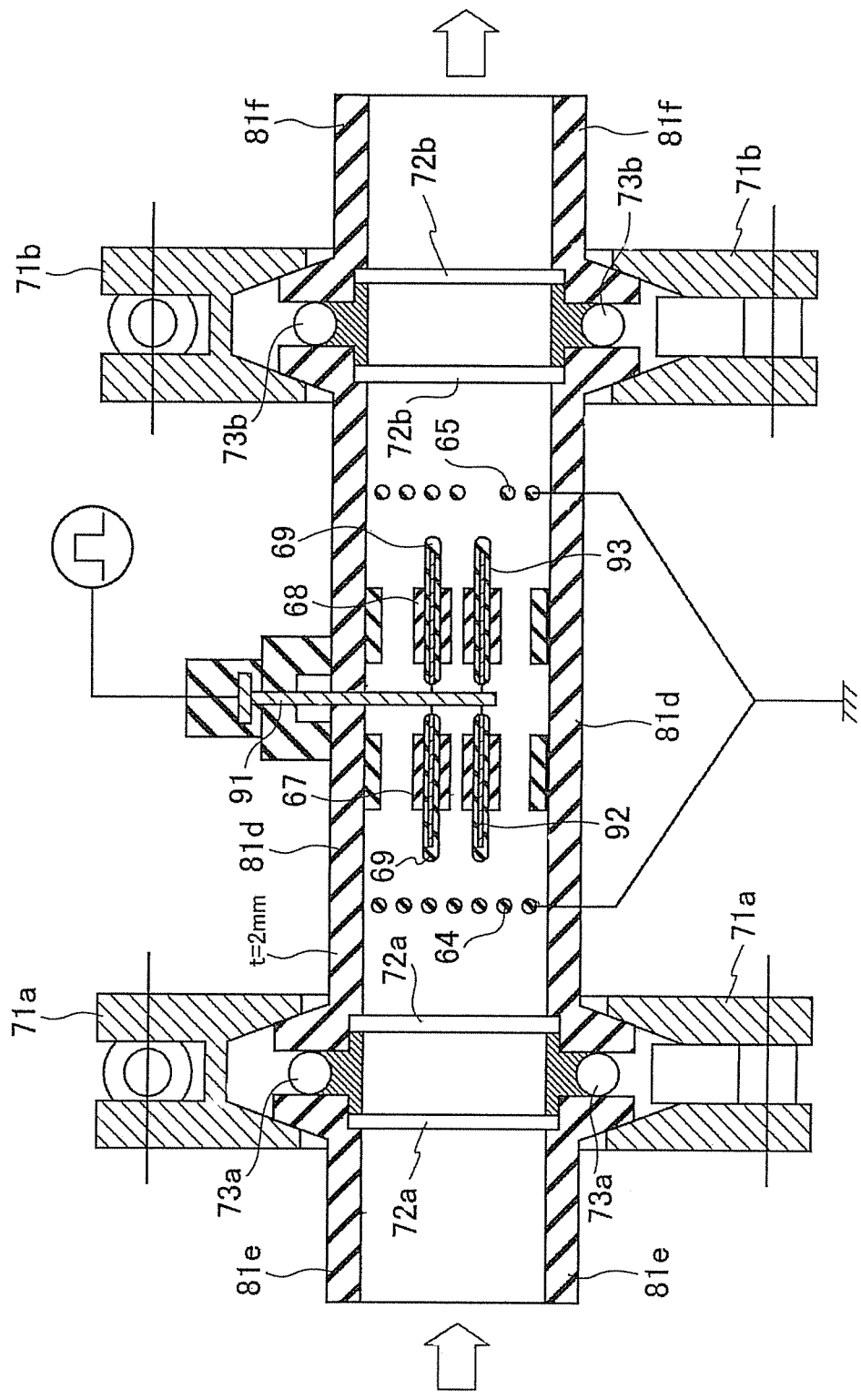
FIG. 14 is a schematic cross-sectional view of a gas reforming device according to a second embodiment of the present invention.

As shown in FIG. 14, a gas reforming device according to a second embodiment of the present invention includes: a first cathode 64 and a second cathode 65, which are arranged opposite to each other, individually include grid-like insulators, and individually include grounding electrodes (not shown) on peripheral portions thereof; and common anodes 92 and 93 which are sandwiched between surfaces (opposite surfaces) of the first cathode 64 and the second cathode 65 so as to be spaced apart therefrom. Then, the grounding electrodes are individually brought into contact with end portions of ion sheath layers individually spread on the surfaces of the first cathode 64 and the second cathode 65, whereby the ground potential is given individually to the ion sheath layers, and the process gas introduced in a direction parallel to a direction of a shortest inter-electrode distances between the first cathode 64 and the common anodes 92 and between the second cathode 65 and the common anodes 93 is activated by plasmas individually formed between the first cathode 64 and the common anodes 92 and between the second cathode 65 and the common anodes 93, and the reform gas is generated.

The first cathode 64 and the second cathode 65 are inserted from an outside of a cylindrical gas reforming container 81$d$ into an inside thereof. The common anodes 92 and 93 are housed in the inside of the gas reforming container 81$d$. The gas reforming container 81$d$ is connected to a left-side pipe 81$e$ through an O-ring 73$a$ and a center ring 72$a$. The O-ring 73$a$ between the gas reforming container 81$d$ and the left-side pipe 81$e$ is compressed by a clamp 71$a$, and keeps a tight vacuum. The gas reforming container 81$d$ is connected to a right-side pipe 81$f$ through an O-ring 73$b$ and a center ring 72$b$. The O-ring 73$b$ between the gas reforming container 81$d$ and the right-side pipe 81$f$ is compressed by a clamp 71$b$, and keeps a tight vacuum. As shown by arrows, the process gas is introduced into an inside of a gas reforming container 81$e$ from one end of a flow passage, which is located at a left-side end portion of FIG. 14, reform gas activated by double unipolar-type plasmas is jetted to a sample (not shown), which is placed on an outside of the gas reforming container 81$f$, from the other end of the flow passage, which is located at a right-side end portion of a gas reforming container 81$f$, and a surface of the sample is treated.

In a similar way to the gas reforming device according to the first embodiment, the process gas is selected in response to process contents of the gas reforming container 81$d$. For example, the process gas may be nitrogen gas with high purity, gas of highly active elemental chlorine or chloride, or may be highly active gas such as halide (fluoride, bromide, iodide or the like) other than the chloride. Moreover, the process gas may be other gas such as mixed gas of any of these highly active gases and the nitrogen gas, rare gas or the like. Besides these, in response to the usage purpose of the reform gas, such as the surface treatment, the process gas may be gas of air, oxygen or an oxygen compound. Purity, dew point and the like of the process gas are selected in response to the usage purpose of the surface treatment.

As a summary is shown in FIG. 14, the left-side common anodes 92 are coated with tubular protection dielectrics 69, and the right-side common anodes 93 are coated with tubular protection dielectrics 60. For the coating for the left-side common anodes 92 with the protection dielectrics 69 and the coating for the right-side common anodes 93 with the protection dielectrics 69, a ceramic coating method, a gel casting method, a glass method and the like are used. The left-side common anodes 92 and the right-side common anodes 93 are fixed to the inside of the gas reforming container 81$d$ through holding members 67 made of an insulator and holding members 68 made of an insulator, respectively. In the first cathode 64 and the second cathode 65, at least the surfaces thereof just need to be made of an insulator (dielectric), and accordingly, the first cathode 64 and the second cathode 65 may include conductors such as metal in insides thereof.

Figure 15:
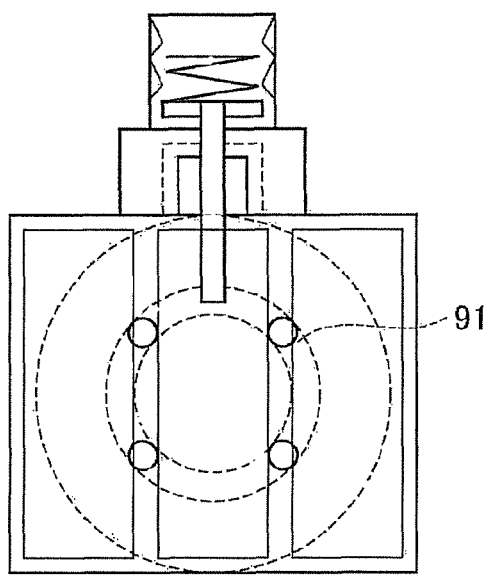
FIG. 15 is a schematic side view of introduction wires which the gas reforming device according to the second embodiment includes.

The left-side common anodes 92 and the right-side common anodes 93 are short-circuited to potentials equal to each other by plate-like introduction wires 91 shown in FIG. 15, and are further connected to an external pulse power supply (not shown). Pulse voltages in which the maximum rise rate $dV/dt$ is 100 to 600 kV/μs or more (maximum: 1000 kV/μs) are individually applied to between the first cathode 64 and the common anodes 92 and to between the second cathode 65 and the common anodes 93. It is preferable that a pulse width of the pulse voltages be approximately 50 to 300 ns in terms of the half-width, and it is preferable that the repetition number of pulses be approximately 1 kpps to several 10 kpps. Others are substantially similar to those of the gas reforming device according to the first embodiment, and accordingly, a duplicate description is omitted.

Also in the double unipolar-type discharge shown in FIG. 14, which generates the plasmas individually between the first cathode 64 and the common anodes 92 and between the second cathode 65 and the common anodes 93, the process gas introduced in the direction parallel to the direction of the shortest inter-electrode distances between the first cathode 64 and the common anodes 92 and between the second cathode 65 and the common anodes 93 is activated, the reform gas is thereby generated, the reform gas is jetted from one end of the flow passage, which is located on the right-side end portion of the gas reforming container 81$f$, to the sample (not shown) placed on the outside, and a surface of the sample is treated.

EXAMPLE

Figure 16:
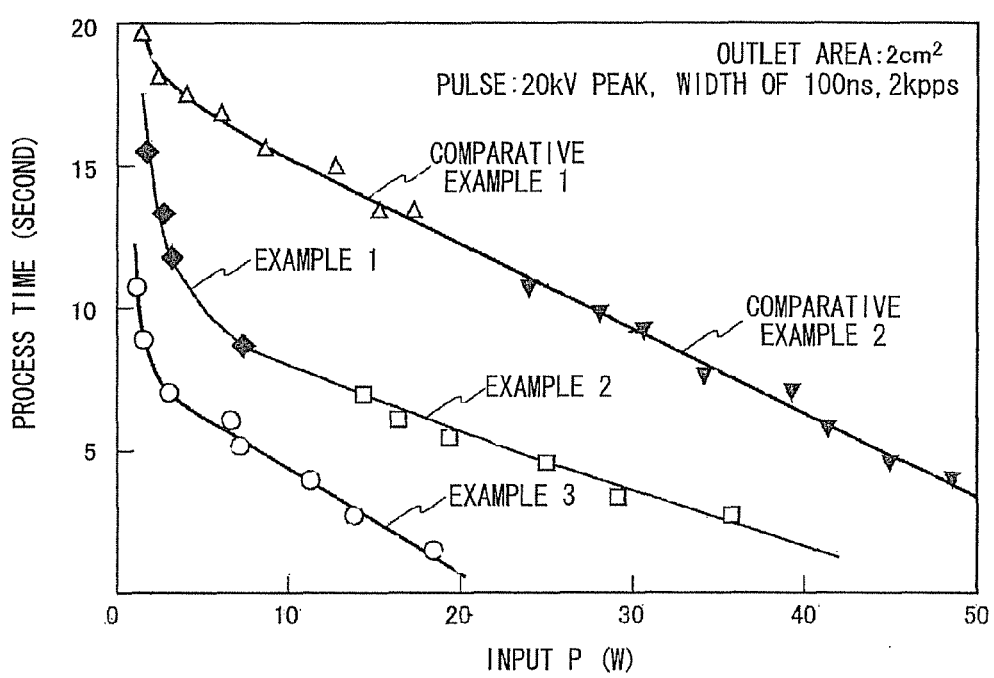
FIG. 16 is a diagram comparing effects in a case of treating a surface of a quartz plate.

FIG. 16 shows data in which an effect of a remote plasma method of treating a surface of a quartz plate by the reform gas activated by the plasma reformer is compared among Examples 1 to 3 and Comparative examples 1 and 2. A description regarding an effect of reforming a surface of a sample 5 is shown in FIG. 30. The reform gas jetted as remote plasma reforms a surface layer of the sample 5, whereby a state of the surface of the sample 5 is changed from a state shown in FIG. 30($a$), where surface energy is low and activity of the surface is low, to a state view shown in FIG. 30($b$), where the surface energy is high and the activity of the surface is high, and hydrophilicity of the surface of the sample 5 is enhanced. Therefore, as an index for measuring activity of the reform gas, a contact angle of water with the surface of the sample 5 of which surface is reformed by the reform gas is used. Accordingly, in FIG. 16, an effect in the case of introducing nitrogen gas into the plasma reformer at 5 L/second, jetting the reform gas activated by the plasma onto the quartz plate placed at a distance of 5 mm from a discharge port of the plasma reformer and treating the surface of the quartz plate is compared. FIG. 16 is a graph in which the respective effects of Examples 1 to 3 and Comparative examples 1 and 2 are plotted while taking, on an axis of ordinates, a time (process time) required until the contact angle of the water with the quartz plate becomes 5 degrees or less after the process from 50 degrees before the process, and taking, on an axis of abscissas, input power necessary to generate the plasma. For the generation of the plasma in each of the plasma reformers, a cylindrical gas reforming container was used, and an area of an outlet side of a flow passage of the gas reforming container that jets the reform gas was set at 2 cm² in each thereof. In the event of the generation of the plasma in each of the plasma reformers, a pulse voltage was applied, in which a peak voltage is 20 kV, a pulse width is 100 ns, and the repetition number of pulses is 2 kpps.

Figure 17:
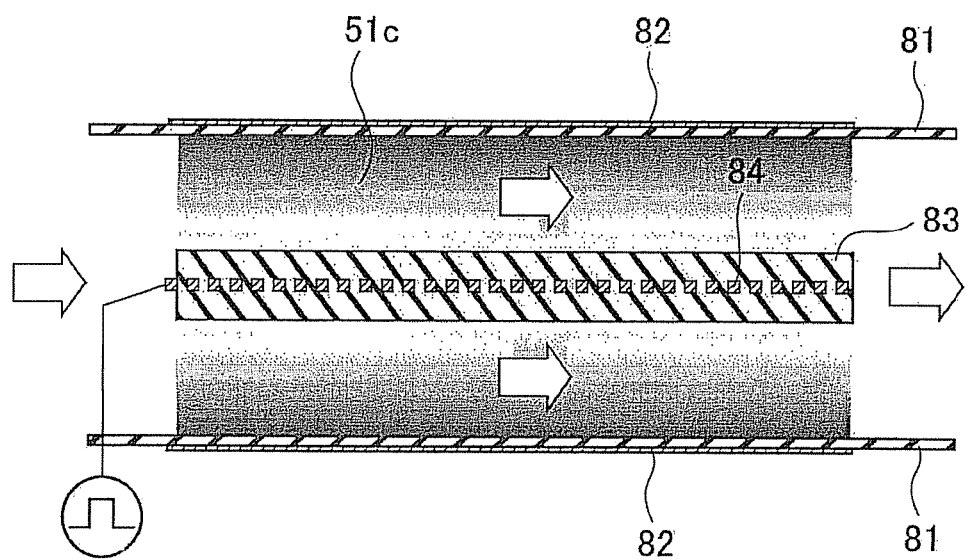
FIG. 17 is a schematic cross-sectional view of a coaxial cylinder-type plasma reformer according to Comparative example 1.

The plasma reformer used in Comparative example 1 shown on the upper left of FIG. 16 is a coaxial cylinder-type plasma reformer shown in FIG. 17, in which a cylindrical cathode 82 is provided on an outer circumferential surface of a cylindrical gas reforming container 81 made of a dielectric (ceramics), and an anode 84 coated with a dielectric (ceramics) 83 is provided on a cylindrical axis on a center of the gas reforming container 81. As shown by arrows, the process gas was introduced into a flow passage in an inside of the gas reforming container 81 from a left side of FIG. 17 to a right side thereof, and the reform gas activated by the plasma was jetted onto the quartz plate placed on the outside of the gas reforming container 81, and a surface of the quartz plate was treated. As shown in FIG. 16, in Comparative example 1, approximately 13 to 20 minutes are required as the process time by the remote plasma, and efficient process is not achieved.

Figure 18:
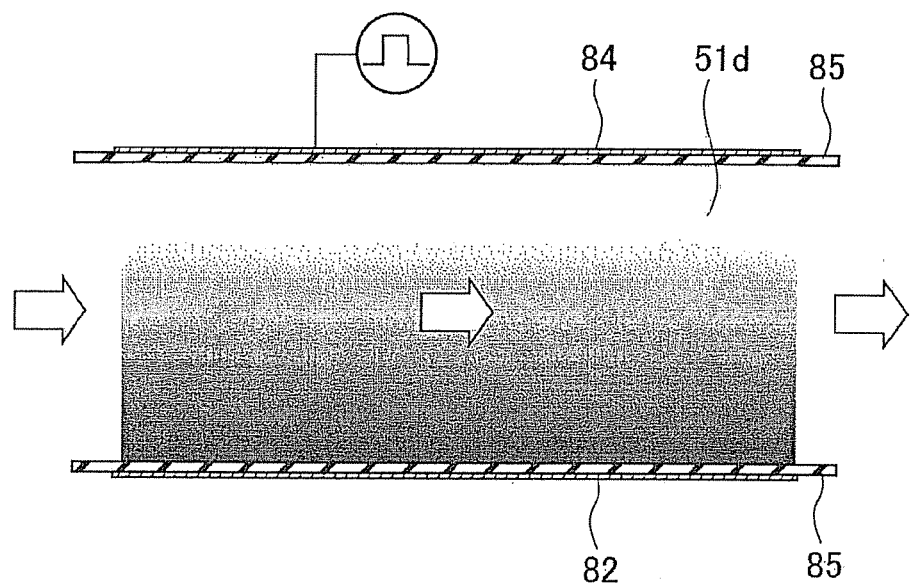
FIG. 18 is a schematic cross-sectional view of a parallel flat plate-type plasma reformer according to Comparative example 2.

The plasma reformer used in Comparative example 2 shown from the center of FIG. 16 to the lower right thereof is a parallel flat plate-type plasma reformer shown in FIG. 18, in which a plate-like anode 84 is provided on an upper inner surface of a gas reforming container 85 made of a tubular dielectric (ceramics) rectangular in cross section, and a plate-like cathode 82 is provided on a lower inner surface of the gas reforming container 85. As shown by arrows, the process gas was introduced into a flow passage in an inside of the gas reforming container 85 from a left side of FIG. 18 to a right side thereof, and the reform gas activated by the plasma was jetted onto the quartz plate placed on the outside of the gas reforming container 85, and a surface of the quartz plate was treated. As shown in FIG. 16, in Comparative example 2, approximately 22 to 49 W is required as the input power, and efficient process is not achieved.

Figure 19:
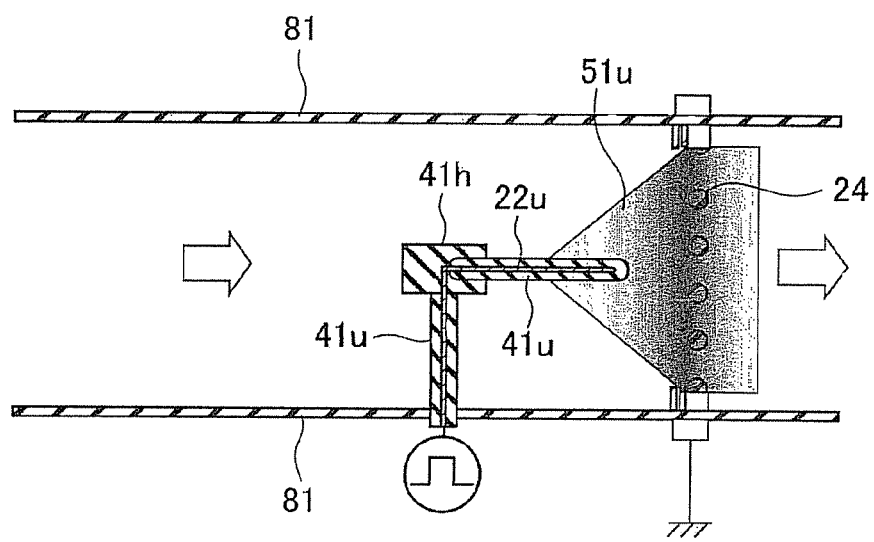
FIG. 19 is a schematic cross-sectional view of a gas reforming device according to Example 1.

Example 1 located below Comparative example 1 corresponds to the base (basic structure) of the first and second embodiments, and shows an effect in the case of the unipolar-type plasma reformer shown in FIG. 19, which includes, in the inside of the gas reforming container 81 made of the cylindrical dielectric (ceramics), the cathode 24 including the grid-like insulator and including the grounding electrodes (not shown) on the peripheral portions thereof, and the anode 22*u* that allows the tip end portion thereof to be opposed to the cathode 24. As shown by arrows, the process gas was introduced into the flow passage in the inside of the gas reforming container 81 from a left side of FIG. 19 to a right side thereof, the reform gas activated by the unipolar-type plasma was jetted from one end of the flow passage, which was located on the right-side end portion of the gas reforming container 81, onto the quartz plate placed on the outside of the gas reforming container 81, and the surface of the quartz plate was treated. In the unipolar-type plasma reformer, the ground potential was given to the cathode 24, and the plasma region 51*u* containing the plasma is formed between the cathode 24 and the anode 22*u*. As shown in FIG. 16, when the unipolar-type plasma reformer is used, in the case where the input power is approximately 2 W to 7 W, a process time by the remote plasma is approximately 8 to 16 minutes, and the process efficiency is improved in comparison with Comparative example 1.

Figure 20:
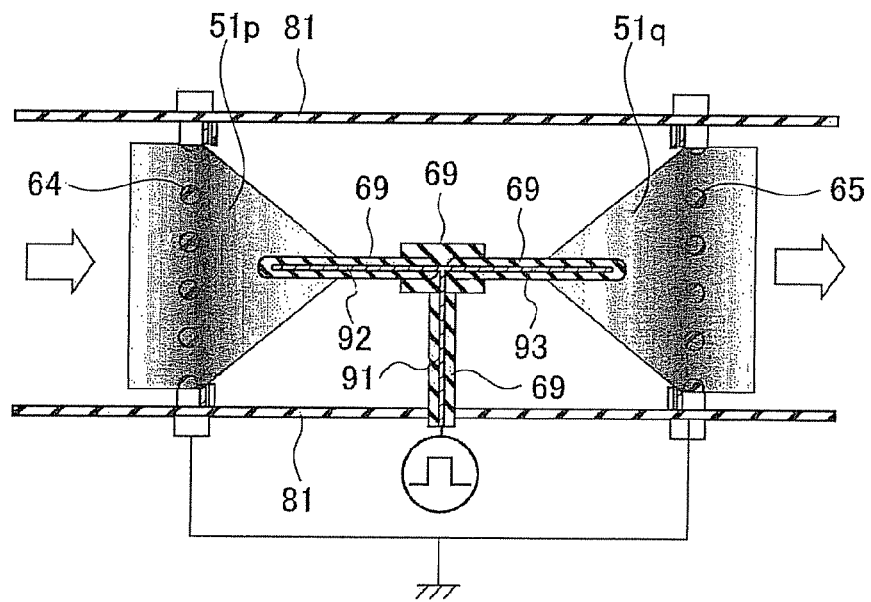
FIG. 20 is a schematic cross-sectional view of a gas reforming device according to Example 2.

Example 2 located below Comparative example 2 corresponds to the second embodiment, and shows an effect in the case of the double unipolar-type plasma reformer shown in FIG. 20, which includes, in the inside of the gas reforming container 81 made of the cylindrical dielectric (ceramics), the first and second cathodes 64 and 65 arranged opposite to each other, individually including the grid-like insulators, and individually including the grounding electrodes (not shown) on the peripheral portions thereof, and the common anodes (92, 93) sandwiched between the respective tip ends of the first cathode 64 and the second cathode 65 so as to be spaced apart therefrom. The common anode 92 and the common anode 93 are individually coated with the protection dielectrics 69. The introduction wires 91 to the common anode 92 and the common anode 93 are also coated with the protection dielectrics 69. As shown by arrows, the process gas was introduced into the flow passage in the inside of the gas reforming container 81 from a left side of FIG. 20 to a right side thereof, the reform gas activated by the double unipolar-type plasma was jetted from one end of the flow passage, which was located on the right-side end portion of the gas reforming container 81, onto the quartz plate placed on the outside of the gas reforming container 81, and the surface of the quartz plate was treated. In the double unipolar-type plasma reformer, the ground potential is given to the first cathode 64 and the second cathode 65, and plasma regions 51*p* and 51*q* of non-thermal equilibrium plasma are individually formed between the first cathode 64 and the common anode 92 and between the second cathode 65 and the common anode 93. As shown in FIG. 16, when the double unipolar-type plasma reformer is used, in the case where the input power is approximately 13 W to 36 W, the process time by the remote plasma is approximately 3 to 7 minutes, and it is understood that the process efficiency is considerably improved in comparison with Comparative examples 1 and 2.

Figure 21:
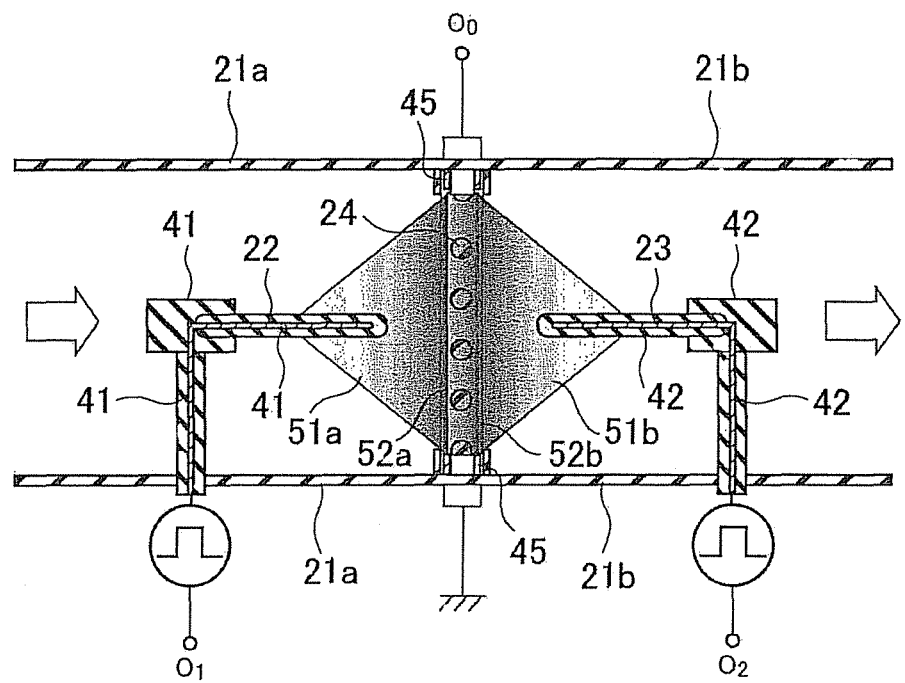
FIG. 21 is a schematic cross-sectional view of a gas reforming device according to Example 3.

Example 3 located on the lower left of FIG. 16 corresponds to the first embodiment, and shows an effect in the case of the bipolar-type plasma reformer shown in FIG. 21, which includes, in the insides of the gas reforming containers 21*a* and 21*b* made of the cylindrical dielectrics (ceramics), the first and second anodes 22 and 23 arranged opposite to each other, and the common cathode 24 that is sandwiched between the respective tip ends of the first anode 22 and the second anode 23 so as to be spaced apart therefrom, includes the grid-like insulator, and includes grounding electrodes 45 on the peripheral portions thereof. As shown by arrows, the process gas was introduced into the flow passage in the inside of the gas reforming container 81 from a left side of the gas reforming container 21*a* in FIG. 21 to a right side thereof, the reform gas activated by the bipolar-type plasma was jetted from one end of the flow passage, which was located on the right-side end portion of the gas reforming container 21*b*, onto the quartz plate placed on the outside of the gas reforming container 21*b*, and the surface of the quartz plate was treated. The first anode 22 is coated with the protection dielectric 41, and the second anode 23 is coated with the protection dielectric 42. In the bipolar-type plasma reformer, the ground potential is given to the common cathode 24, and the pulses in which the polarities are equal to each other are applied to the first anode 22 and the second anode 23, and plasma regions 51*a* and 51*b* including the plasmas are formed between the first anode 22 and the common cathode 24 and between the second anode 23 and the common cathode 24, respectively. As shown in FIG. 16, when the bipolar-type plasma reformer is used, in the case where the input power is approximately 1 W to 18 W, the process time by the remote plasma is approximately 11 to 2 minutes, and the process efficiency is improved in comparison with Examples 1 and 2.

Other Embodiments

As described above, the present invention has been described by the embodiments and the base (basic structure) of these; however, the description and the drawings, which form a part of this disclosure, do not limit the present invention. From this disclosure, embodiments, examples and operation technologies, which serve as a variety of alternatives, will be obvious to those skilled in the art.

Figure 22:
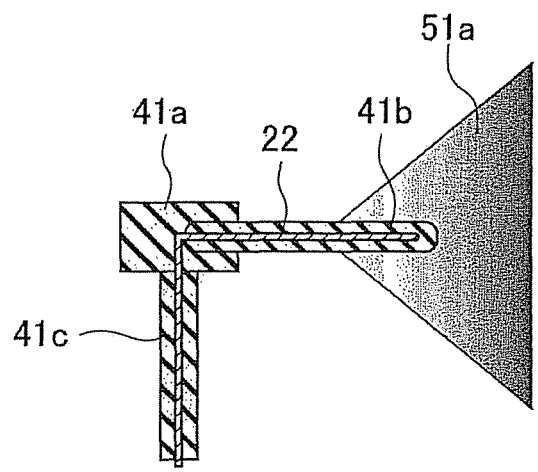
FIG. 22 is a schematic cross-sectional view of an anode.
Figure 25:
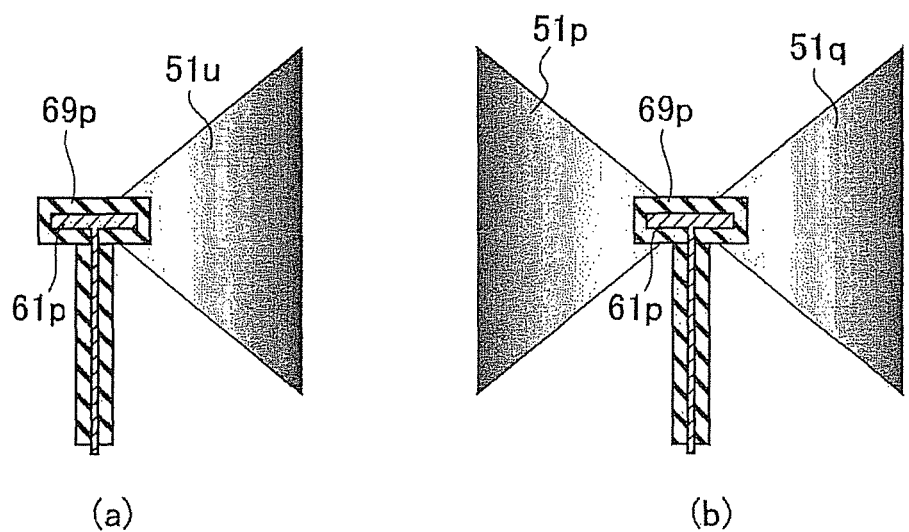
FIG. 25 is a schematic cross-sectional view of an anode.

For example, structures shown in FIG. 22 to FIG. 29 are also adopted for the first anode 22 and the second anode 23, which are used in the bipolar-type plasma reformer, or for the common anodes used in the double unipolar-type plasma reformer. FIG. 22 shows a structure of an anode 22 suitable for use in the bipolar-type plasma reformer or the unipolar-type plasma reformer, and shows a state where the plasma region 51a including the plasma is formed from the tip end of the anode 22 in a state where the metal-made anode 22 is coated with the protection dielectrics 41a, 41b and 41c by using the ceramic coating method, the gel casting method, the glass method or the like.

FIG. 23 shows a structure of common anodes 92 and 93 suitable for use in the double unipolar-type plasma reformer, and shows a state where, in a state where the metal-made anodes 92 and 93 are coated with the protection dielectrics 69a, 69b and 69c by using the ceramic coating method, the gel casting method, the glass method or the like, the plasma region 51p including the plasma is formed from the tip end on the left side of the anode 92, and the plasma region 51q including the plasma is formed from the tip end on the right side of the anode 93. The introduction wires 91 to the metal-made anodes 92 and 93 are also coated with the protection dielectrics 69d by using the ceramic coating method, the gel casting method, the glass method or the like.

FIG. 24(a) shows a structure of an anode 22p suitable for use in the bipolar-type plasma reformer or the unipolar-type plasma reformer, and shows a state where the plasma region 51u including the plasma is formed from the tip end of the metal-made anode 22p in a state where the anode 22p is coated with a protection dielectric 41p by using the ceramic coating method, the gel casting method, the glass method or the like. FIG. 24(b) shows a case where the anode 22p with the structure shown in FIG. 24(a) is used for the double unipolar-type plasma reformer, and shows a state where the plasma region 51p including the plasma is generated from the left side of the tip end of the anode 22p and the plasma region 51q including the plasma is formed from the right side of the tip end thereof. In FIG. 24(a) and FIG. 24(b), the bar-like portions including the tip ends are extended in the direction perpendicular to the direction where the process gas flows. Moreover, balls larger in diameter than the bar-like portions are formed on the tip ends. In such a way, spots other than the tip ends are suppressed from becoming starting points of the electric discharge.

FIG. 25(a) shows a structure of an anode 61p suitable for use in the bipolar-type plasma reformer or the unipolar-type plasma reformer, and shows a state where the plasma region 51u including the plasma is formed from the tip end of the metal-made anode 61p in a state where the anode 61p is coated with the protection dielectric 69p by using the ceramic coating method, the gel casting method, the glass method or the like. FIG. 25(b) shows a case where the anode 61p having the structure shown in FIG. 25(a) is used for the double unipolar-type plasma reformer, and shows a state where the plasma region 51p including the plasma is formed from the left side of the tip end 61p and the plasma region 51q of the non-thermal equilibrium plasma is formed from the right side thereof.

Figure 26:
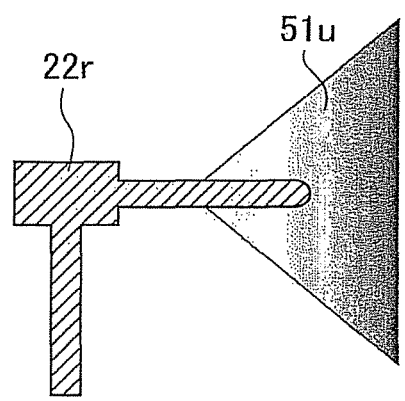
FIG. 26 is a schematic cross-sectional view of an anode.
Figure 29A:
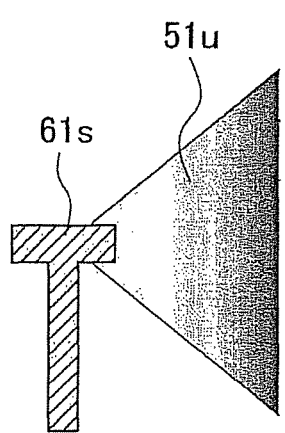
FIG. 29 is a schematic cross-sectional view of an anode.
Figure 29B:
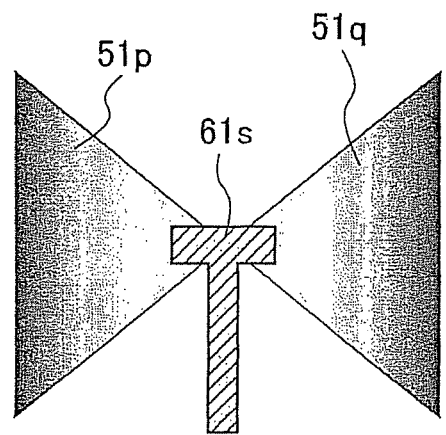

FIG. 26 to FIG. 29 show structures of anodes formed of conductive ceramics such as silicon carbide (SiC) with electrical resistivity of approximately 10Ω·cm. FIG. 26 shows a structure of an anode 22r suitable for use in the bipolar type-plasma reformer or the unipolar-type plasma reformer, and shows a state where the plasma region 51u including the plasma is formed from a tip end of the anode 22r. FIG. 27 shows a structure of an anode 61r suitable for use in the double unipolar-type plasma reformer, and shows a state where the plasma region 51p including the plasma is formed from a left-side tip end of the anode 61r and the plasma region 51q including the plasma is formed from a right-side tip end thereof. FIG. 28(a) shows a structure of an anode 22s in a case of being used for the bipolar-type plasma reformer or the unipolar-type plasma reformer, and shows a state where the plasma region 51u including the plasma is formed from a tip end of the anode 22s. FIG. 28(b) shows a case of using the anode 22s having the structure of FIG. 28(a) for the double unipolar-type plasma reformer, and shows a state where the plasma region 51p including the plasma is formed from a left side of a tip end of the anode 22s and the plasma region 51q including the plasma is formed from a right side of the tip end. FIG. 29(a) shows a structure of an anode 61p in a case of being used for the bipolar-type plasma reformer or the unipolar-type plasma reformer, and shows a state where the plasma region 51u including the plasma is formed from a tip end of the anode 61s. FIG. 29(b) shows a case of using the anode 61s having the structure of FIG. 29(a) for the double unipolar-type plasma reformer, and shows a state where the plasma region 51p including the plasma is formed from a left side of a tip end of the anode 61s and a plasma region 51q of the non-thermal equilibrium plasma is formed from a right side of the tip end.

The present invention has been described in detail; however, the above description is illustrative in all the aspects, and the present invention is not limited to this. Innumerable modification examples which are not illustrated are conceivable without departing from the scope of the present invention. In particular, it is naturally planned to combine the described items with one another.

The invention claimed is:

1. A gas reforming device comprising:
a flow passage forming body in which a flow passage through which process gas flows is formed;
a cathode provided on a cross section of said flow passage;
a first anode that is provided apart from said cathode, and includes a bar-like portion; and
a pulse power supply that applies a pulse voltage to between said cathode and said first anode,
wherein said cathode includes:
an opening array body having a planar structure in which openings through which the process gas passes are arrayed, wherein the entirety of said opening array body is made of an insulator and said opening array body has a surface made of an insulator; and
a grounding electrode provided on a peripheral portion of said flow passage, wherein said grounding electrode is in contact with only a peripheral portion of said surface of said opening array body,
a tip end of said bar-like portion of said first anode is located in an inside of said flow passage, and is spaced apart from said opening array body in a direction parallel to a direction where the process gas flows, and said grounding electrode is provided at a position of contacting an end portion of an ion sheath layer spread on the surface of said opening array body by the application of the pulse voltage to between said cathode and said anode.

2. The gas reforming device according to claim 1, further comprising:

a second anode that is provided apart from said anode, and includes a bar-like portion, wherein said pulse power supply also applies a pulse voltage to between said second anode and said cathode, a tip end of the bar-like portion of said second anode is located in the inside of said flow passage, and is spaced apart from said opening array body in the direction parallel to the direction where the process gas flows, and said cathode is sandwiched between the tip end of the bar-like portion of said first anode and the tip end of the bar-like portion of said second anode.

3. A gas reforming device comprising:

first and second anodes arranged opposite to each other; and a common cathode that is sandwiched between respective tip ends of said first and second anodes so as to be spaced apart therefrom, comprising a grid shape and a grounding electrode, wherein the entirety of said grid shape is made of an insulator and said grid shape has a surface made of an insulator, with said grounding electrode provided on a peripheral portion of said common cathode, wherein said grounding electrode contacts only a peripheral portion of said surface of said grid shape body, wherein said grounding electrode is brought into contact with an end portion of an ion sheath layer spread on the surface of said common cathode, whereby a grounding potential is given to said ion sheath layer, and pulse voltages in which polarities are equal to each other are applied to said first and second anodes, and process gas introduced in a direction parallel to a direction of shortest inter-electrode distances between said first anode and said common cathode and between said second anode and said common cathode is activated by non-thermal equilibrium low-temperature plasmas individually formed between said first anode and said common cathode and between said second anode and said common cathode, and reform gas is generated.

4. The gas reforming device according to claim 3, wherein pulse voltages in which a maximum rise rate dV/dt is 100 to 1000 kV/µs are individually applied to between said first anode and said common cathode and to between said second anode and said common cathode.

5. The gas reforming device according to claim 3, wherein pressures between said first anode and said common cathode and between said second anode and said common cathode are an atmospheric pressure.

6. The gas reforming device according to claim 3, wherein pressures between said first anode and said common cathode and between said second anode and said common cathode are in a reduced-pressure state with a pressure of 10 kPa or more.

* * * * *